(12) United States Patent
Wang et al.

(10) Patent No.: US 11,818,420 B2
(45) Date of Patent: Nov. 14, 2023

(54) CROSS-DEVICE CONTENT PROJECTION METHOD AND ELECTRONIC DEVICE

(71) Applicant: Huawei Technologies Co., Ltd., Shenzhen (CN)

(72) Inventors: Yudong Wang, Beijing (CN); Xiaohui Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/773,346

(22) PCT Filed: Oct. 29, 2020

(86) PCT No.: PCT/CN2020/124854
§ 371 (c)(1),
(2) Date: Apr. 29, 2022

(87) PCT Pub. No.: WO2021/083280
PCT Pub. Date: May 6, 2021

(65) Prior Publication Data
US 2022/0353571 A1   Nov. 3, 2022

(30) Foreign Application Priority Data

Oct. 30, 2019 (CN) .......................... 201911047072.0

(51) Int. Cl.
*H04N 21/4363* (2011.01)
*H04N 21/41* (2011.01)
*H04N 21/436* (2011.01)
*H04N 21/439* (2011.01)

(52) U.S. Cl.
CPC ... *H04N 21/43637* (2013.01); *H04N 21/4131* (2013.01); *H04N 21/439* (2013.01); *H04N 21/43615* (2013.01)

(58) Field of Classification Search
CPC ......... H04N 21/43637; H04N 21/4131; H04N 21/43615; H04N 21/439; H04N 21/41407; H04N 21/482; H04N 21/485; H04N 21/8106; H04N 21/8133; H04N 21/8547; H04N 21/4122; H04N 21/47217
See application file for complete search history.

(56) References Cited

U.S. PATENT DOCUMENTS

| 8,498,572 B1 * | 7/2013 | Schooley ............ H04L 12/2809 340/10.51 |
| 10,440,473 B1 | 10/2019 | Moore |
| 2012/0139951 A1 | 6/2012 | Hwang et al. |

(Continued)

FOREIGN PATENT DOCUMENTS

| CN | 101384025 A | 3/2009 |
| CN | 103595775 A | 2/2014 |

(Continued)

*Primary Examiner* — Oschta I Montoya
(74) *Attorney, Agent, or Firm* — Conley Rose, P.C.

(57) ABSTRACT

A cross-device content projection method includes a first electronic device starting to play first content. The first electronic device obtains, from a near-field communication (NFC) tag, N second electronic devices bound to the NFC tag, where N is an integer greater than 1. The first electronic device projects, according to a preset projection policy, the first content onto at least two of the N second electronic devices for continuous playing.

10 Claims, 21 Drawing Sheets

(56) References Cited

U.S. PATENT DOCUMENTS

| | | | |
|---|---|---|---|
| 2012/0226736 | A1 | 9/2012 | Falchuk et al. |
| 2013/0198056 | A1* | 8/2013 | Aldrey ............... G06Q 30/0201 |
| | | | 705/38 |
| 2014/0136978 | A1 | 5/2014 | Verma |
| 2014/0324439 | A1 | 10/2014 | Feng et al. |
| 2016/0057563 | A1 | 2/2016 | Yang |
| 2016/0094648 | A1 | 3/2016 | Han et al. |
| 2018/0367843 | A1* | 12/2018 | Han ................. H04N 21/41407 |
| 2020/0059754 | A1* | 2/2020 | Carter .................. H04B 5/0043 |
| 2022/0272399 | A1* | 8/2022 | Zhang .................... H04W 4/80 |

FOREIGN PATENT DOCUMENTS

| | | |
|---|---|---|
| CN | 103795444 A | 5/2014 |
| CN | 103974457 A | 8/2014 |
| CN | 104063155 A | 9/2014 |
| CN | 104202461 A | 12/2014 |
| CN | 104798379 A | 7/2015 |
| CN | 105573609 A | 5/2016 |
| CN | 102486716 B | 6/2016 |
| CN | 110392292 A | 10/2019 |
| CN | 110958475 A | 4/2020 |
| EP | 2681667 A1 | 1/2014 |
| EP | 4044609 A1 | 8/2022 |
| WO | 2012121993 A1 | 9/2012 |
| WO | 2013150334 A1 | 10/2013 |

* cited by examiner

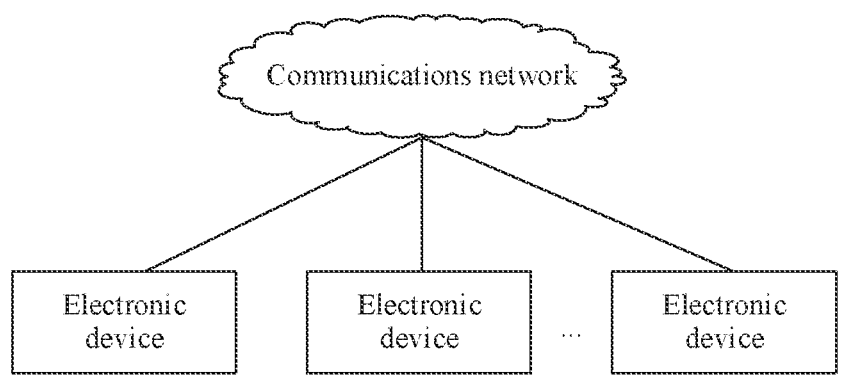
FIG. 1
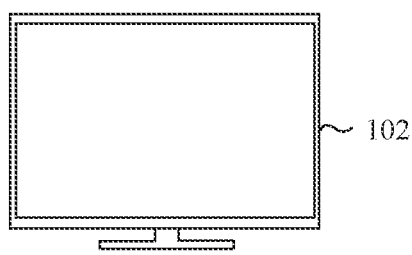
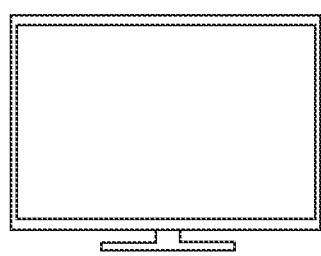
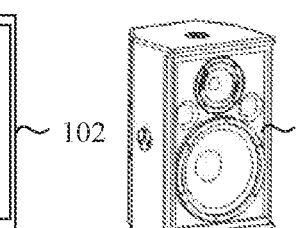
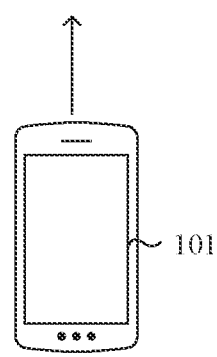
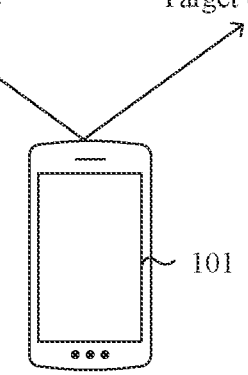
FIG. 2(a)  FIG. 2(b)

CROSS-DEVICE CONTENT PROJECTION METHOD AND ELECTRONIC DEVICE

CROSS-REFERENCE TO RELATED APPLICATIONS

This is a U.S. National Stage of International Patent Application No. PCT/CN2020/124854 filed on Oct. 29, 2020, which claims priority to Chinese Patent Application No. 201911047072.0 filed on Oct. 30, 2019. Both of the aforementioned applications are hereby incorporated by reference in their entireties.

TECHNICAL FIELD

This application relates to the terminal field, and in particular, to a cross-device content projection method and an electronic device.

BACKGROUND

With development of intelligent terminal technologies, a user or a family usually has a plurality of electronic devices, and the user often needs to switch between the plurality of electronic devices. For example, the user watches a video on a mobile phone, and after going home, the user may want to switch the video to a TV for continuous watching. For another example, the user may use a notebook computer for work at home, and when leaving home, the user may want to switch a file in the notebook computer to the mobile phone for continuous work.

In such a cross-device interaction scenario, the user usually needs to manually project content in one device onto one or more other devices. For example, the user may connect electronic devices such as the mobile phone, a smart TV, and a speaker to a same Wi-Fi network. When the user needs to project content in the mobile phone onto another electronic device, the user may use a projection function or projection software in the mobile phone to search for a plurality of electronic devices in the current Wi-Fi network. Further, the user may select, from the plurality of found electronic devices, a target device that receives the current projection content. In this way, the mobile phone may project projection content such as a picture, a video, and audio onto the target device through the Wi-Fi network. It is clearly that such a process of switching projection content between the plurality of devices is time-consuming, operations are cumbersome, and user experience is not good.

SUMMARY

This application provides a cross-device content projection method and an electronic device, so that the electronic device can conveniently and quickly project projection content onto a plurality of other electronic devices for playing, to improve working efficiency of collaboration between a plurality of devices during content projection.

To achieve the foregoing objective, the following technical solutions are used in this application.

According to a first aspect, this application provides a cross-device content projection method, including: A first electronic device starts to play first content. For example, the first content may include display content and/or audio content. Further, when a distance between the first electronic device and an NFC tag is close enough, the first electronic device may obtain, from the NFC tag, N (N is an integer greater than 1) second electronic devices bound to the NFC tag. In this way, the first electronic device may project, according to a preset projection policy, the first content onto at least one of the N second electronic devices for continuous playing.

That is, the first electronic device may conveniently and quickly determine a plurality of target devices for current content projection by reading the second electronic devices bound to the NFC tag, to automatically start to project the current projection content onto the plurality of target devices. This simplifies a user's operation procedure during cross-device content projection, improves and enriches user experience, and improves working efficiency of collaboration between a plurality of devices during content projection.

The first content projected by the first electronic device onto the second electronic device may include some or all of display content that is being displayed in a display interface of the first electronic device. For example, the first electronic device may project, onto the second electronic device as the first content, all the display content that is being displayed in a first interface (for example, a desktop). For another example, the first electronic device may project, onto the second electronic device as the first content, an image in a video in a play interface that is being displayed.

Alternatively, the first content projected by the first electronic device onto the second electronic device may also include audio content that is being played by the first electronic device, for example, music that is being played by the first electronic device or audio that is being played and that is synchronized with a video. Certainly, after the first electronic device projects the first content onto the second electronic device, if the first electronic device starts to play other content (for example, second content) in response to a user operation, the first electronic device may continue to project the second content onto the second electronic device for playing.

In a possible implementation, that the first electronic device obtains, from the NFC tag, the N second electronic devices bound to the NFC tag includes: In response to a OneHop operation of approaching or touching the NFC to by the first electronic device, the first electronic device reads identifiers of the N second electronic devices stored in the NFC tag, to determine the N second electronic devices bound to the NFC tag. Alternatively, after detecting an NFC signal from the NFC tag by using an NFC chip of the first electronic device, the first electronic device reads, through the NFC signal, identifiers of the N second electronic devices stored in the NFC tag, to determine the N second electronic devices bound to the NFC tag.

That is, the user may trigger, in a manner of approaching or touching the NFC tag, the first electronic device to read, by using an NFC function, the identifiers of the second electronic devices stored in the NFC tag, to determine the N second electronic devices onto which the first electronic device currently projects content.

In a possible implementation, that the first electronic device projects, according to the preset projection policy, the first content onto the at least one of the N second electronic devices for continuous playing includes: The first electronic device sends, according to the preset projection policy, the first content to the at least one of the N second electronic devices for playing. That is, the first electronic device may serve as a master device for current content projection, to control the second electronic device to perform content projection.

For example, the N second electronic devices may include a first speaker and a second speaker. That the first electronic device sends, according to the preset projection policy, the first content to the at least one of the N second electronic devices for playing includes: The first electronic device sends the first content to the first speaker for playing, where the first speaker is a speaker closest to the first electronic device. Alternatively, the first electronic device sends the first content to the first speaker and the second speaker for playing.

For example, the first electronic device may compare a distance between the first electronic device and the first speaker and a distance between the first electronic device and the second speaker. If the distance between the first speaker and the first electronic device is less than a preset value, and the distance between the second speaker and the first electronic device is greater than the preset value, it indicates that the first speaker is closer to the first electronic device and the second speaker is farther from the first electronic device. In this case, the first electronic device may send the first content to the first speaker for playing, to complete current content projection.

For another example, if the distance between the first speaker and the first electronic device is less than a preset value, and the distance between the second speaker and the first electronic device is also less than the preset value, it indicates that both the first speaker and the second speaker are very close to the first electronic device. In this case, the first electronic device may send the first content to the first speaker and the second speaker, to project the first content onto the first speaker and the second speaker for playing. Certainly, the first electronic device may also determine, according to a stored projection policy, a specific device or specific devices to which the first content is sent for playing. This is not limited in this embodiment of this application.

In a possible implementation, that the first electronic device sends the first content to the first speaker and the second speaker for playing includes: The first electronic device sends a first audio component in the first content to the first speaker for playing, and the first electronic device sends a second audio component in the first content to the second speaker for playing. Certainly, if the N second electronic devices further include a third speaker, the mobile phone may send a third audio component in the first content to the third speaker for playing. That is, the first electronic device may send a corresponding audio component in the current projection content to each speaker, so that a plurality of speakers each play a received audio component, to implement a play effect of a stereo sound or a surround sound.

In a possible implementation, the N second electronic devices may include a speaker (there may be one or more speakers) and a TV (there may be one or more TVs). That the first electronic device sends, according to the preset projection policy, the first content to the at least one of the N second electronic devices for playing includes: The first electronic device may send display content (for example, an image or a video) in the first content to the TV for playing, and the first electronic device sends audio content in the first content to the speaker for playing. Alternatively, the first electronic device may send display content in the first content to the TV for playing, and the first electronic device sends audio content in the first content to the TV and the speaker for playing.

In a possible implementation, after the first electronic device obtains, from the NFC tag, the N second electronic devices bound to the NFC tag, the method further includes: The first electronic device determines a master device in the N second electronic devices. That the first electronic device projects, according to the preset projection policy, the first content onto the at least one of the N second electronic devices for continuous playing includes: The first electronic device sends the first content to the master device, so that the master device controls, according to the preset projection policy, at least one of the N second electronic devices to play the first content. That is, the first electronic device may determine the master device in the N second electronic devices, and the master device controls the N second electronic devices to implement current content projection.

For example, the N second electronic devices may include a TV and a lamp. That the first electronic device determines a master device in the N second electronic devices includes: The first electronic device determines the TV as the master device in the N second electronic devices. In this case, the preset projection control policy may include: The TV plays display content and audio content in the first content, and the TV sends a control instruction to the lamp based on the first content, to control brightness or a color of light emitted by the lamp, so as to implement different lighting effects.

In a possible implementation, after the first electronic device determines the master device in the N second electronic devices, the method further includes: The first electronic device sends the stored projection policy to the master device. Certainly, the master device may also obtain the projection policy from another electronic device or a server.

In a possible implementation, before the first electronic device projects, according to the preset projection policy, the first content onto the at least one of the N second electronic devices for continuous playing, the method further includes: The first electronic device synchronizes time with the N second electronic devices, where the first content sent by the first electronic device carries a timestamp, and the timestamp indicates play progress of the first content. Time of the devices is synchronized after the first electronic device synchronizes time with the N second electronic devices. Therefore, when the second electronic device plays the projection content based on the timestamp in the first content, it can be ensured that play progress on the second electronic devices is the same.

In a possible implementation, after the first electronic device obtains, from the NFC tag, the N second electronic devices bound to the NFC tag, the method further includes: The first electronic device receives the projection policy entered by the user for the N second electronic devices. That is, during content projection, the user may manually set a corresponding projection policy for a plurality of devices participating in current content projection.

According to a second aspect, this application provides a cross-device content projection method, including: A first electronic device displays a binding interface of an NFC tag, where the binding interface includes a list of candidate devices to be bound to the NFC tag, and the candidate devices in the candidate device list and the first electronic device are located in a same communications network. If the first electronic device detects a user's first operation of selecting M (M is an integer greater than 0) second electronic devices from the candidate device list, in response to the first operation, the first electronic device may prompt the user to move the first electronic device to approach or touch the NFC tag, so that the first electronic device can write identifiers of the M second electronic devices into the NFC tag, to establish binding relationships between the NFC tag and the M second electronic devices.

In this way, when the first electronic device needs to project content subsequently, the first electronic device may determine, by reading an identifier of a bound device in the NFC tag, one or more second electronic devices bound to the NFC tag, that is, a target device for content projection.

In a possible implementation, that a first electronic device displays a binding interface of an NFC tag includes: The first electronic device reads a preset flag bit in the NFC tag. If a value of the flag bit is a first preset value, it indicates that the NFC tag is not bound to any electronic device, and the first electronic device may open a preset projection application to display the binding interface of the NFC tag.

In a possible implementation, after the first electronic device writes the identifiers of the M second electronic devices into the NFC tag, the method further includes: The first electronic device changes the value of the flag bit from the first preset value to a second preset value, to indicate that the NFC tag is bound to one or more electronic devices.

In a possible implementation, after the first electronic device writes the identifiers of the M second electronic devices into the NFC tag, the method further includes: The first electronic device displays a projection policy setting interface. The first electronic device receives a projection policy entered by the user in the setting interface for the M second electronic devices, and stores the projection policy. That is, after the first electronic device establishes the corresponding binding relationships in the NFC tag, the user may continue to set, in the projection application, the projection policy used for content projection onto the M second electronic devices bound to the NFC tag.

For example, when M=1, the projection policy may include correspondences between different NFC operations and projection instructions, for example, a correspondence between touching the NFC tag once and a projection instruction 1, and a correspondence between touching the NFC tag twice and a projection instruction 2.

For another example, when M>1, the projection policy may include a content projection rule that is set for each second electronic device. For example, if the M second electronic devices include a TV, a speaker, and a lamp, the user may separately set a specific projection rule for projection onto the TV, the speaker, and the lamp in the setting interface.

For example, when the M second electronic devices include a first speaker and a second speaker, the projection policy may be: A speaker closest to a source device plays projection content. Alternatively, the projection policy is: The first speaker plays a first audio component in projection content and the second speaker plays a second audio component in the projection content.

For another example, when the M second electronic devices include a TV and a speaker, the projection policy may be: The TV plays display content in projection content, and the speaker plays audio content in the projection content; or the TV plays display content in projection content; and the speaker and the TV play audio content in the projection content.

For another example, when the M second electronic devices include a TV and a lamp, the projection policy is: The TV plays projection content, and the TV controls a lighting effect of the lamp.

In a possible implementation, after the first electronic device writes the identifiers of the M second electronic devices into the NFC tag, the method further includes: The first electronic device sends the binding relationships between the NFC tag and the M second electronic devices to another electronic device or a server. In this way, the first electronic device may share the binding relationship with the another electronic device for use, or the server may obtain the binding relationship when the user logs in to the server by using another electronic device.

For example, the candidate devices in the candidate device list and the first electronic device may be located in a same Wi-Fi network, or the candidate devices in the candidate device list and the first electronic device may be bound to a same account.

For example, that the first electronic device writes an identifier of the second electronic device into the NFC tag includes: In response to a OneHop operation of approaching or touching the NFC tag by the first electronic device, the first electronic device writes the identifier of the second electronic device into the NFC tag; or after detecting an NFC signal from the NFC tag by using an NFC chip of the first electronic device, the first electronic device may write the identifier of the second electronic device into the NFC tag. That is, the user may trigger, in a manner of approaching or touching the NFC tag, the first electronic device to write the identifier of the second electronic device into the NFC tag.

Similarly, that the first electronic device reads a preset flag bit in the NFC tag includes: In response to a OneHop operation of approaching or touching the NFC tag by the first electronic device, the first electronic device may read the preset flag bit in the NFC tag; or after detecting an NFC signal from the NFC tag by using an NFC chip of the first electronic device, the first electronic device may read the preset flag bit in the NFC tag. That is, the user may trigger, in a manner of approaching or touching the NFC tag, the first electronic device to read the preset flag bit in the NFC tag.

According to a third aspect, this application provides a content projection system, including a first electronic device, N second electronic devices, and an NFC tag, where N is an integer greater than 1. The NFC tag stores binding relationships between the NFC tag and the N second electronic devices. The first electronic device is configured to perform the cross-device content projection method according to any one of the foregoing implementations.

In a possible implementation, the N second electronic devices include a master device. The master device is configured to receive first content sent by the first electronic device; and control, according to a preset projection policy, at least one of the N second electronic devices to play the first content. Alternatively, the first electronic device may serve as a master device, and control, according to a preset projection policy, at least one of the N second electronic devices to play the first content.

According to a fourth aspect, this application provides an electronic device, including a touchscreen, a communications interface, one or more processors, a memory, and one or more computer programs. The processor is coupled to the touchscreen, the communications interface, and the memory. The one or more computer programs are stored in the memory. When the electronic device runs, the processor executes the one or more computer programs stored in the memory, so that the electronic device performs the cross-device content projection method according to any one of the foregoing implementations.

According to a fifth aspect, this application provides a computer storage medium, including computer instructions. When the computer instructions are run on an electronic device, the electronic device is enabled to perform the cross-device content projection method according to any one of the foregoing implementations.

According to a sixth aspect, this application provides a computer program product. When the computer program product is run on an electronic device, the electronic device is enabled to perform the cross-device content projection method according to any one of the foregoing implementations.

It may be understood that, the content projection system in the third aspect, the electronic device in the fourth aspect, the computer-readable storage medium in the fifth aspect, and the computer program product in the sixth aspect that are provided above are all configured to perform the corresponding methods provided above. Therefore, for beneficial effects that can be achieved by the content projection systems, the computer-readable storage medium, and the computer program product, refer to beneficial effects in the corresponding methods provided above. Details are not described again herein.

BRIEF DESCRIPTION OF DRAWINGS

FIG. 1 is a schematic diagram 1 of architecture of a content projection system according to an embodiment of this application;

FIG. 2(a) and FIG. 2(b) are schematic diagrams 2 of architectures of content projection systems according to an embodiment of this application;

DESCRIPTION OF EMBODIMENTS

Figure 3:
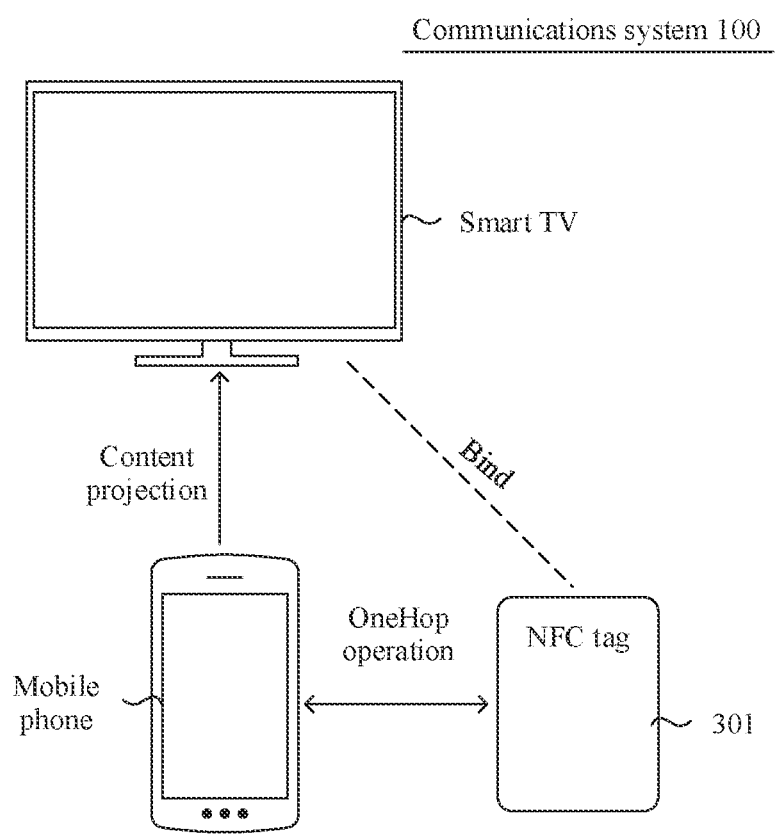
FIG. 3 is a schematic diagram 3 of an architecture of a content projection system according to an embodiment of this application.

The following describes implementations of embodiments in detail with reference to accompanying drawings.

A cross-device content projection method provided in embodiments of this application may be used in a communications system (which may also be referred to as a content projection system) 100 shown in FIG. 1. As shown in FIG. 1, the communications system 100 may include N (N is an integer greater than 1) electronic devices. The N electronic devices may be interconnected through a communications network.

For example, the communications network may be a wired network, or may be a wireless network. For example, the communications network may be a local area network (local area networks, LAN), or may be a wide area network (wide area networks, WAN), for example, the internet. The foregoing communications network may be implemented by using any known network communications protocol. The foregoing network communications protocol may be various wired or wireless communications protocols, such as Ethernet, a universal serial bus (universal serial bus, USB), a firewire (FIREWIRE), a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), Long Term Evolution (long term evolution, LTE), Bluetooth, wireless fidelity (wireless fidelity, Wi-Fi), NFC, a Voice over Internet Protocol (voice over Internet protocol, VoIP), a communications protocol that supports a network slicing architecture, or any other suitable communications protocol.

For example, in some embodiments, the electronic devices in the communications system 100 may establish a Wi-Fi connection to each other by using a Wi-Fi protocol. In some other embodiments, after logging in to a same account (for example, a Huawei ID), the electronic devices in the communications system 100 may be interconnected through one or more servers.

For example, the communications system 100 may include a first electronic device 101 and a second electronic device 102. For example, as shown in FIG. 2(a), the first electronic device 101 may serve as a source device, and the second electronic device 102 may serve as a target device of the first electronic device 101. The electronic device 101 may project content displayed or played by the electronic device 101 onto the second electronic device 102. In subsequent embodiments, specific content projected from one electronic device onto another electronic device may be referred to as projection content. For example, the projection content may include text, a picture, a video, audio, an animation, a lighting effect, or a web page. For example, the electronic device may send the projection content such as text, a picture, a video, audio, an animation, or a web page to another electronic device for displaying or playing. Alternatively, the electronic device may send a light control instruction as projection content to another electronic device, to control a lamp to generate a corresponding lighting effect.

In some embodiments, the first electronic device 101 may have a plurality of target devices. For example, in addition to the first electronic device 101 and the second electronic device 102, the communications system 100 may further include a third electronic device 103. As shown in FIG. 2(*b*), when the first electronic device 101 is a source device, both the second electronic device 102 and the third electronic device 103 may serve as target devices of the first electronic device 101 to receive projection content sent by the first electronic device 101. In this way, the first electronic device 101 may simultaneously project the projection content onto the plurality of electronic devices for displaying or playing. For example, a mobile phone may simultaneously project an audio file of the mobile phone onto a plurality of speakers for playing. For another example, the mobile phone may project a displayed video image onto a TV for displaying, and simultaneously project audio content corresponding to the video image onto a speaker for playing.

That is, the source device in the communications system 100 may project the projection content onto one or more target devices, to implement cross-device interaction during content projection between a plurality of devices.

In embodiments of this application, an electronic tag bound to one or more electronic devices may be further disposed in the communications system 100, and may also be referred to as a radio frequency tag or an MID (radio frequency identification, radio frequency identification) tag. An electronic device may read, by sending a radio frequency signal, information stored in the electronic tag.

For ease of understanding by a person skilled in the art, an operating principle of the electronic tag is described herein in embodiments of this application.

For example, the electronic tag may be in three implementation forms: a passive tag, a semi-active tag, and an active tag. In embodiments of this application, the electronic tag may be any one of the passive tag, the semi-active tag, or the active tag.

(1) Passive tag: When an electronic tag is a passive tag, there is no internal power supply in the electronic tag. When approaching an NFC (near field communication, near field communication) chip of another device, the electronic tag may receive electromagnetic wave information sent by the NFC chip of the another device. In this case, an internal integrated circuit (integrated circuit, IC) of the electronic tag is driven by a received electromagnetic wave signal. When receiving an electromagnetic wave signal of sufficient strength, the electronic tag may send data such as device information of the notebook computer stored in the electronic tag to the NFC chip the another device.

(2) Semi-active tag: A working mode of the semi-active tag is similar to that of the passive tag. When an electronic tag is a semi-active tag, the electronic tag includes a small battery, and power of the small battery is sufficient to drive an internal IC of the electronic tag, so that the IC is in a working state. Because the semi-active tag includes the small battery, the semi-active tag responds faster than the passive tag.

(3) Active tag: When an electronic tag is an active tag, the electronic tag includes an internal power supply, to supply a power supply required by an internal IC to generate an external signal. Usually, the active tag allows radio frequency communication at a relatively long distance, and the active tag has a relatively large storage space that may be used to store data transmitted by an NFC chip of another device.

As shown in FIG. 3, the electronic tag may be specifically an NFC tag 301 (the NFC tag may also be referred to as an NFC patch) implemented by using an NFC technology. When an NFC chip in an electronic device (for example, a mobile phone) touches or approaches the NFC tag 301, the NFC chip in the mobile phone may detect an NFC signal sent by the NFC tag 301, to read, through the NFC signal, information stored in the NFC tag 301. That is, the mobile phone may respond to a OneHop operation of approaching or touching the NFC tag 301, and obtain, from the NFC tag 301, the information stored in the NFC tag 301.

For example, a coil is usually disposed in the NFC tag 301, and the coil may store binding relationships between the NFC tag 301 and one or more electronic devices. One electronic device may be bound to one or more NFC tags 301. For example, each NFC tag 301 uniquely corresponds to one NFC card number. In this case, an NFC card number of the NFC tag 301 and an identifier of an electronic device A may be written into the coil of the NYC tag 301 in advance, to establish a binding relationship between the NFC tag 301 and the electronic device A in the NFC tag 301.

It may be understood that the binding relationship stored in the NFC tag 301 may be preset when the NFC tag 301 is delivered from a factory, or may be manually set by a user when the NFC tag 301 is used (for example, used for the first time). This is not limited in embodiments of this application.

For example, the NFC tag 301 is bound to a TV (which may also be referred to as a smart. TV) in the communications system 100. Still as shown in FIG. 3, when a user needs to project content displayed or played in a source device (for example, a mobile phone) as projection content onto the smart TV (that is, a target device), the user may enable an NFC function of the mobile phone and make the mobile phone approach or touch the NFC tag 301. When a distance between the mobile phone and the NFC tag 301 is close enough, the mobile phone may read a binding relationship between the NFC tag 301 and the smart TV from the NFC tag 301 by transmitting a near field signal. For example, the mobile phone may read an identifier of the smart TV from the NFC tag 301. The identifier may be a MAC (media access control, media access control) address, a device name, an IP address, or the like of the smart TV.

That is, the mobile phone may determine, by reading the binding relationship, that a target device for current content projection is the smart TV. The mobile phone serves as the source device, and may start to send current projection content to the smart TV based on the read identifier of the smart TV, so that the smart TV can serve as the target device to display or play the projection content, so as to complete a current content projection process.

The TV (or smart TV) may be an analog TV that works by using an analog signal, or may be a digital TV that works by using a digital signal, or may be any display output device that can play an image, audio, or a video. In some scenarios, the TV (or smart TV) may also be referred to as Vision or a large-screen device.

Figure 4:
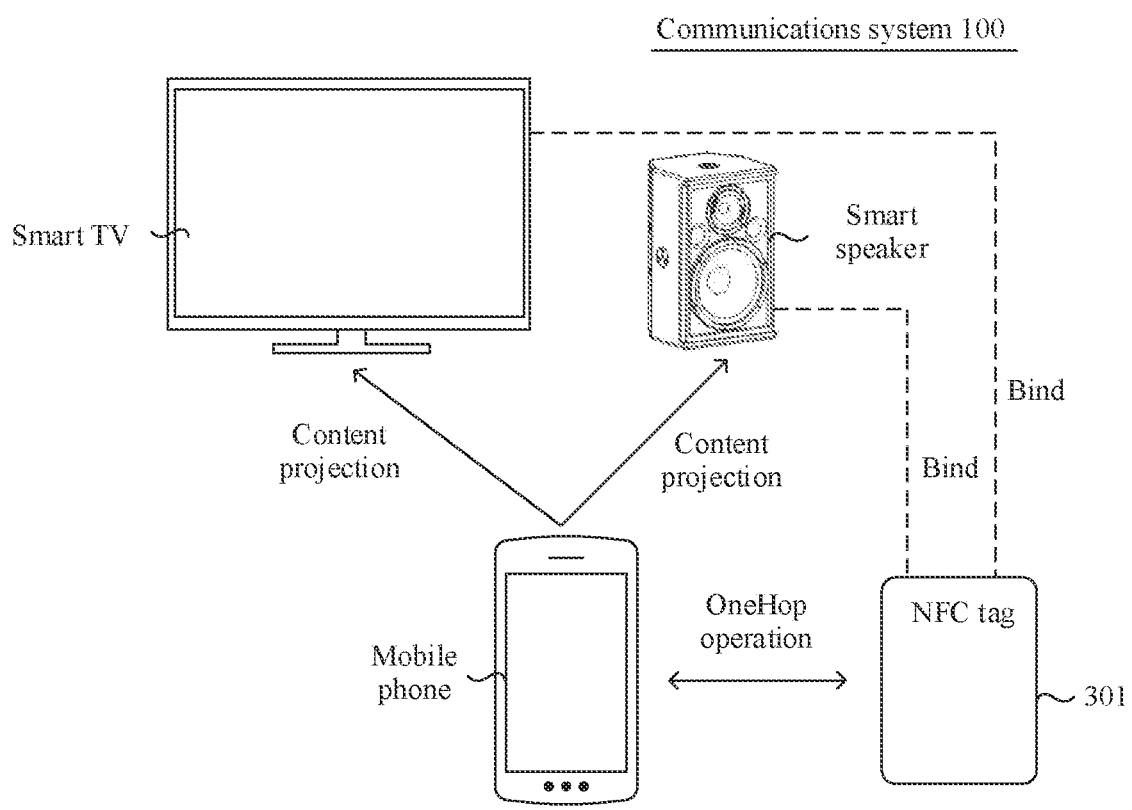
FIG. 4 is a schematic diagram 4 of an architecture of a content projection system according to an embodiment of this application.

In some embodiments, the NFC tag 301 may record binding relationships between the NFC tag 301 and a plurality of electronic devices. For example, the NFC tag 301 may be bound to both a smart TV and a speaker (which may also be referred to as a smart speaker). In this case, as shown in FIG. 4, when the user enables the NFC function of the mobile phone and makes the mobile phone approach or touch the NFC tag 301, the mobile phone may read identifiers of the smart TV and the smart speaker. It indicates that the user currently expects to project projection content in the mobile phone onto the smart TV and the smart speaker. In this way, according to a preset policy, the mobile phone may project display content in the projection content onto the smart TV for displaying, and simultaneously project audio content in the projection content onto the smart speaker for playing, to complete a current content projection process.

It can be learned that, the user uses the source device to touch an NFC tag through "OneHop", so that the source device can conveniently and quickly determine the target devices for current content projection, to automatically start to project current projection content onto the target devices. This simplifies the user's operation procedure during cross-device content projection, improves and enriches user experience, and improves working efficiency of collaboration between a plurality of devices during content projection.

For example, the electronic device in the communications system 100 may be specifically a mobile phone, a tablet computer, a TV, a notebook computer, a smart home device, a wearable electronic device, a vehicle-mounted device, or a virtual reality device. This is not limited in embodiments of this application. The smart home device may be specifically a TV, a speaker, an air conditioner (which may also be referred to as a smart air conditioner), a refrigerator (which may also be referred to as a smart refrigerator), a lamp (which may also be referred to as a smart lamp or a smart lamp bulb), a curtain (which may also be referred to as a smart curtain), or the like.

Figure 5:
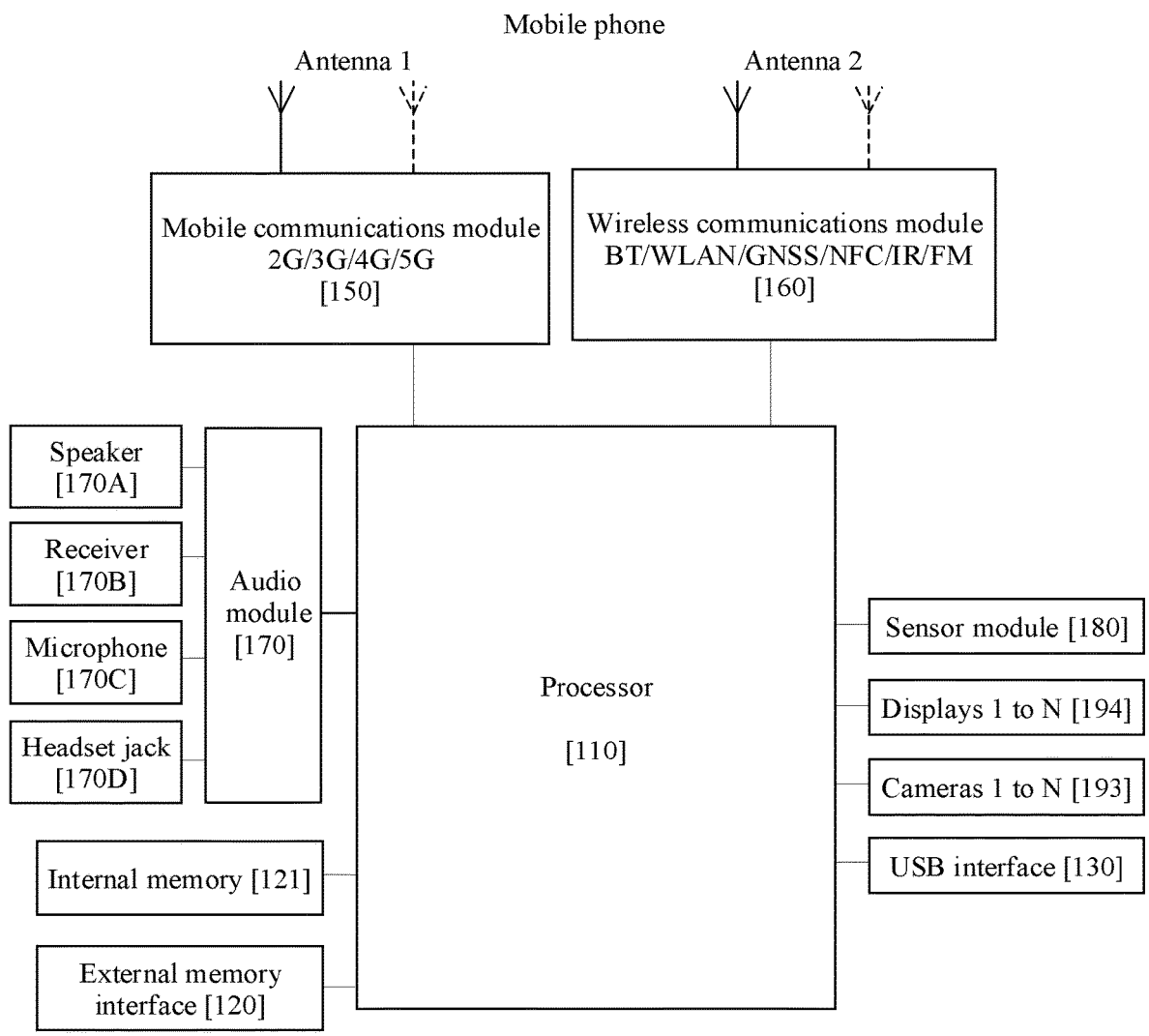
FIG. 5 is a schematic diagram 1 of a structure of an electronic device according to an embodiment of this application.

For example, a mobile phone is the electronic device. FIG. 5 is a schematic diagram of a structure of the mobile phone.

The mobile phone may include a processor 110, an external memory interface 120, an internal memory 121, a universal serial bus (universal serial bus, USB) interface 130, an antenna 1, an antenna 2, a mobile communications module 150, a wireless communications module 160, an audio module 170, a speaker 170A, a receiver 170B, a microphone 170C, a headset jack 170B, a sensor module 180, and the like.

It may be understood that the structure shown in embodiments of the present invention does not constitute a specific limitation on the mobile phone. In some other embodiments of this application, the mobile phone may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory, to avoid repeated access. This reduces a waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

A wireless communication function of the mobile phone may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile phone may be configured to cover one or more communication bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a wireless communication solution that includes 2G/3G/4G/5G or the like and that is applied to the mobile phone. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave by using the antenna 1 for radiation. In some embodiments, at least some function modules of the mobile communications module 150 may be disposed in the processor 110. In some embodiments, at least some function modules in the mobile communications module 150 may be disposed in a same device as at least some modules in the processor 110.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the mobile phone. The wireless communications module 160 may be one or more components that integrate at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and a processed signal into an electromagnetic wave through the antenna 2 for radiation.

In some embodiments, the antenna 1 and the mobile communications module 150 of the mobile phone are coupled, and the antenna 2 and the wireless communications module 160 of the mobile phone are coupled, so that the mobile phone can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), Long Term Evolution (long term evolution, LIE), BT, a GNSS, a WLAN, NFC, FM, an IR technology, and/or the like. The GNSS may include a global positioning system (global positioning system, GPS), a global navigation satellite system (global navigation satellite system, GLONASS), a. BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The mobile phone implements a display function by using the GPU, the display 194, the application processor, and the like. The GPU is a microprocessor for image processing, and is connected to the display 194 and the application processor. The GPU is configured to perform mathematical and geometric calculation, and perform graphics rendering. The processor 110 may include one or more GPUs that execute program instructions to generate or change display information.

The display 194 is configured to display an image, a video, and the like. The display 194 includes a display panel. The display panel may be a liquid crystal display (liquid crystal display. LCD), an organic light-emitting diode (organic light-emitting diode. OLED), an active-matrix organic light emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, QLED), or the like. In some embodiments, the mobile phone may include one or N displays 194, where N is a positive integer greater than 1.

The mobile phone may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RUB or WV. In some embodiments, the mobile phone may include one or N cameras 193, where N is a positive integer greater than 1.

The digital signal processor is configured to process a digital signal, and may process another digital signal in addition to the digital image signal. For example, when the mobile phone selects a frequency, the digital signal processor is configured to perform Fourier transform on frequency energy, and the like.

The video codec is configured to compress or decompress a digital video. The mobile phone may support one or more video codecs. In this way, the mobile phone can play or record videos in a plurality of coding formats, for example, moving picture experts group (moving picture experts group, MPEG)-1, MPEG-2, MPEG-3, and MPEG-4.

The external memory interface 120 may be configured to connect to an external storage card such as a micro SD card, to extend a storage capability of the mobile phone. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to execute various function applications and data processing of the mobile phone. The internal memory 121 may include a program storage area and a data storage area. The program storage area may store an operating system, an application required by at least one function (for example, a sound playing function or an image playing function), and the like. The data storage area may store data (for example, audio data or an address book) created during use of the mobile phone, and the like. In addition, the internal memory 121 may include a high-speed random access memory, or may include a nonvolatile memory, for example, at least one magnetic disk storage device, a flash memory, or a universal flash storage (universal flash storage, UFS).

The mobile phone may implement audio functions such as music playing and recording functions through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The mobile phone may listen to music or answer a hands-free call by using the speaker 170A.

The receiver 170B, also referred to as an "earpiece", is configured to convert an audio electrical signal into a sound signal. When a call is answered or voice information is received by using the mobile phone, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving the mouth of the user close to the microphone 170C to input a sound signal to the microphone 170C. At least one microphone 170C may be disposed in the mobile phone. In some other embodiments, two microphones 170C may be disposed in the mobile phone, to collect a sound signal and further implement a noise reduction function. In some other embodiments, three, four, or more microphones 170C may alternatively be disposed in the mobile phone, to collect a sound signal, reduce noise, further identify a sound source, implement a directional recording function, and the like.

The headset jack 170D is configured to connect to a wired headset. The headset jack 170D may be the USB interface 130 or a 3.5 mm open mobile terminal platform (open mobile terminal platform, OMTP) standard interface or a cellular telecommunications industry association of the USA (cellular telecommunications industry association of the USA, CTIA) standard interface.

The sensor module 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

Certainly, the mobile phone may further include a charging management module, a power management module, a battery, a button, an indicator, One or more SIM card interfaces, and the like. This is not limited in embodiments of this application.

A software system of the mobile phone may use a layered architecture, an event-driven architecture, a microkernel architecture, a microservice architecture, or a cloud architecture. In embodiments of this application, an Android system with a layered architecture is used as an example to describe the software structure of the mobile phone.

Figure 6:
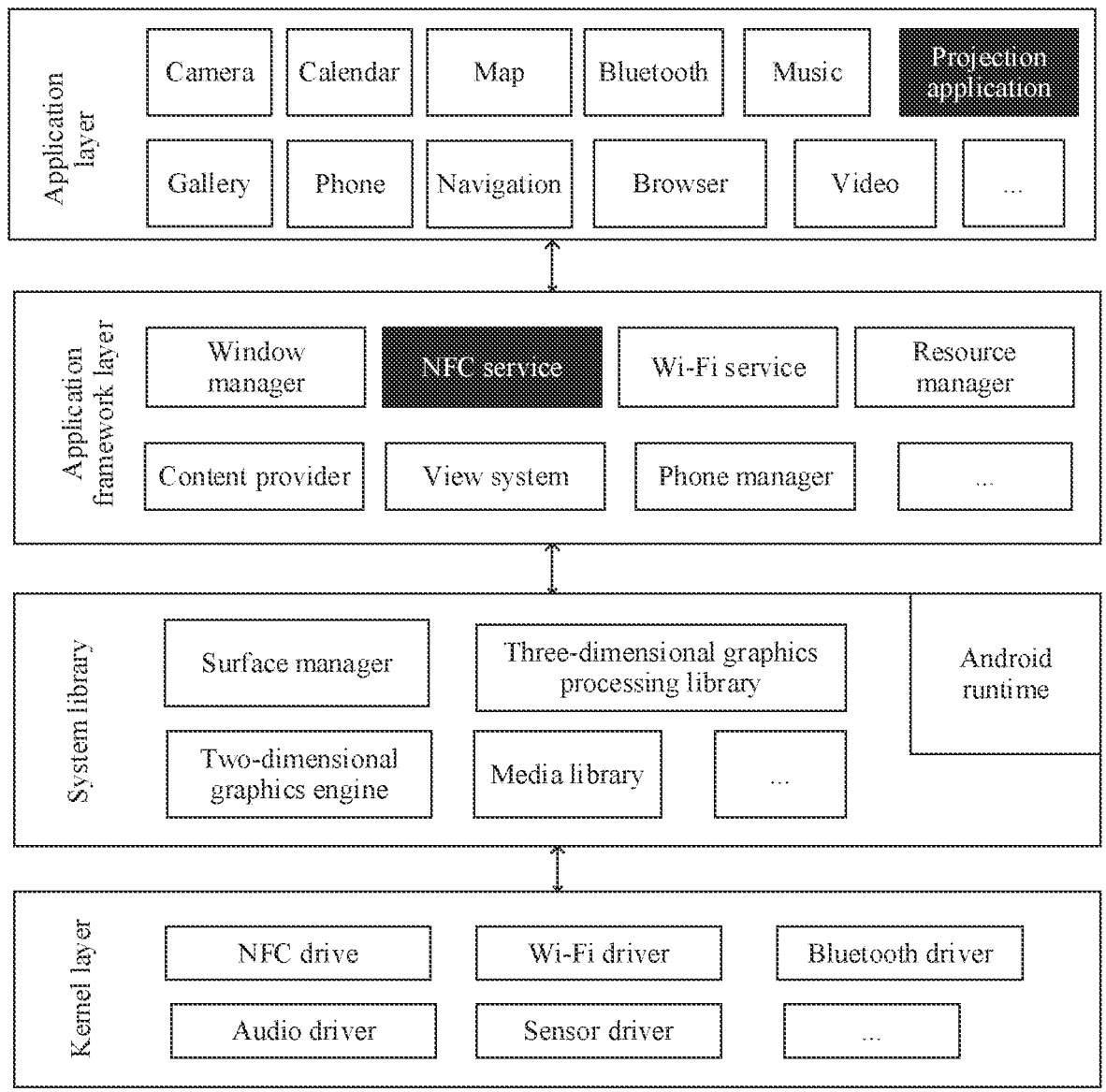
FIG. 6 is a schematic diagram of an architecture of an operating system in an electronic device according to an embodiment of this application.

For example, the mobile phone is still the electronic device. FIG. 6 is a block diagram of a software structure of the mobile phone according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of applications. As shown in FIG. 6, apps (application, application) such as Phone. Memo, Browser, Contacts, Camera, Gallery, Calendar, Map, Bluetooth, Music, Videos, and Messages may be installed at the application layer.

In embodiments of this application, still as shown in FIG. 6, a projection application may be further installed at the application layer. A user may open the projection application from an entry such as a home screen, a setting function, or a drop-down menu.

The projection application may be used as a bridge between the mobile phone (namely, a source device) and another electronic device (namely, a target device) during content projection, to send projection content that needs to be projected in an application in the mobile phone onto the target device. For example, the projection application may receive a projection event reported by the application framework layer. In this way, the projection application may interact with a running application (for example, a video app) and send, to the target device in a wireless communication manner such as content that is being displayed or played in the application as projection content.

In addition, the user may further use the projection application to set binding relationships between an NFC tag and one or more electronic devices. For example, an option used to bind an NFC tag may be set in the projection application. After the mobile phone detects that the user opens the option, the projection application may display a list of to-be-bound electronic devices. After selecting one or more electronic devices that need to be bound from the list, the user may move the mobile phone close to the NFC tag that needs to be bound. In this way, the mobile phone may write, into the NFC tag through the NFC signal, identifiers of the electronic devices selected by the user in the projection application, to establish binding relationships between the NFC tag and the one or more electronic devices in the NFC tag.

The application framework layer provides an application programming interface (application programming interface, API) and a programming framework for an application at the application layer. The application framework layer includes some predefined functions.

In embodiments of this application, as shown in FIG. 6, an NFC service (NFC service) may run at the application framework layer.

For example, after enabling an NFC function, the mobile phone may start to run the NFC service at the application framework layer. When the mobile phone approaches or touches the NFC tag, the NFC service may invoke an NFC driver of the kernel layer to read the binding relationships stored in the NFC tag, so as to obtain a target device for current content projection. Further, the NFC service may report the projection event to the projection application, to trigger the projection application to send, to the target device, content that is being displayed or played by the mobile phone as projection content, and start a current content projection process.

Certainly, as shown in FIG. 6, the application framework layer may further include a Wi-Fi service (Wi-Fi service), a window manager, a content provider, a view system, a phone manager, a resource manager, and the like. This is not limited in embodiments of this application.

The Wi-Fi service may be used to provide a Wi-Fi-related function such as joining a Wi-Fi network or establishing a Wi-Fi P2P connection to another electronic device. The window manager is configured to manage a window program. The window manager may obtain a size of a display, determine whether there is a status bar, perform screen locking, take a screenshot, and the like. The content provider is configured to store and obtain data, and enable the data to be accessed by an application. The data may include a video, an image, audio, calls that are made and received, a browsing history and bookmarks, a phone book, and the like. The view system includes visual controls such as a control for displaying a text and a control for displaying an image. The view system may be configured to construct an application. A display interface may include one or more views. For example, a display interface including a notification icon of Messages may include a text display view and a picture display view. The phone manager is configured to provide a communication function of the mobile phone, for example, management of a call status (including answering, declining, or the like). The resource manager provides various resources for an application, such as a localized character string, an icon, a picture, a layout file, and a video file.

As shown in FIG. 6, the system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications. The media library supports playing and recording of a plurality of commonly used audio and video formats, static image files, and the like. The media library may support a plurality of audio and video coding formats, such as MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The Android runtime includes a kernel library and a virtual machine. The Android runtime is responsible for scheduling and management of the Android system.

The kernel library includes two parts: a function that needs to be called in Java language, and a kernel library of Android.

The application layer and the application framework layer run on a virtual machine. The virtual machine executes Java files of the application layer and the application framework layer as binary files. The virtual machine is configured to perform functions such as object lifecycle management, stack management, thread management, security and exception management, and garbage collection.

The kernel layer is a layer between hardware and software. The kernel layer includes at least a display driver, a camera driver, an audio driver, a sensor driver, and the like. This is not limited in embodiments of this application.

The following describes in detail a cross-device content projection method provided in embodiments of this application with reference to the accompanying drawings.

Figure 7:
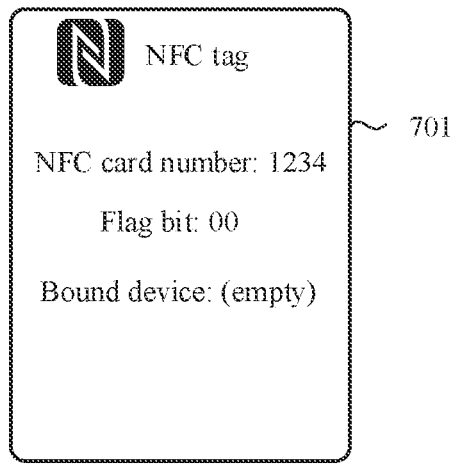
FIG. 7 is a schematic diagram 1 of an application scenario of a cross-device content projection method according to an embodiment of this application.

For example, as shown in FIG. 7, each NFC tag 701 may store an NFC card number of the NFC tag 701 in the NFC tag 701 at delivery. In addition, as shown in FIG. 7, a flag bit may be preset in each NFC tag 701, and the flag bit may be used to indicate whether the NFC tag 701 establishes a binding relationship with an electronic device. For example, when the flag bit in the NFC tag 701 is 00, it indicates that the NFC tag 701 is not bound to an electronic device. When the flag bit in the NFC tag 701 is 01, it indicates that the NFC tag 701 is bound to one or more electronic devices.

When using the NFC tag 701 for the first time, a user may establish, in the NFC tag 701, binding relationships between the NFC tag 701 and one or more electronic devices by using a preset projection application.

Figure 8:
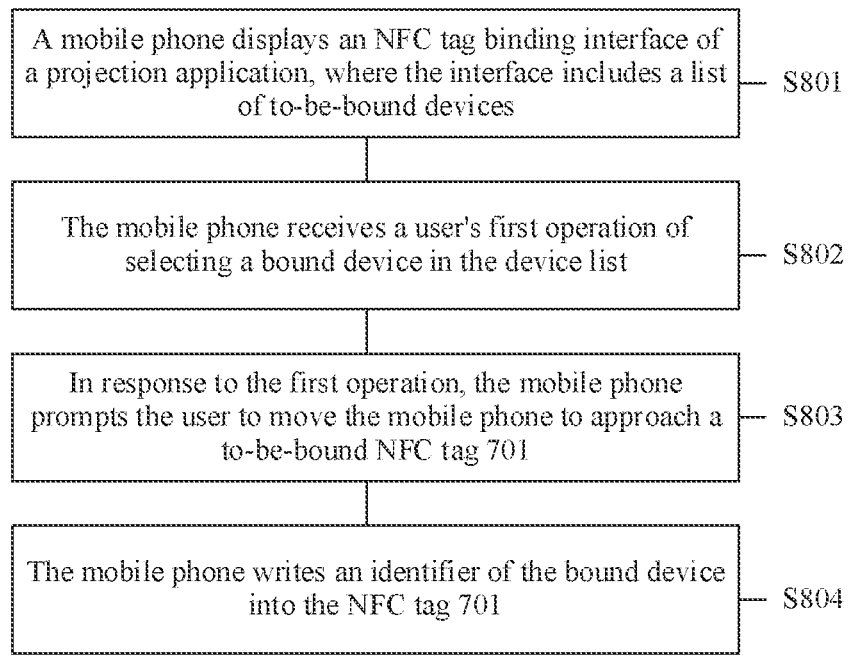
FIG. 8 is a schematic flowchart 1 of a cross-device content projection method according to an embodiment of this application.

In an example in which a projection application is installed on a mobile phone, as shown in FIG. 8, a method for establishing a binding relationship in the NFC tag 701 by using the projection application may include the following steps.

S The mobile phone displays an NFC tag binding interface of the projection application. The interface includes a list of to-be-bound devices.

For example, when using the NFC tag 701 for the first time, the user may enable an NIT function of the mobile phone and make the mobile phone approach or touch the NFC tag 701. In this case, the mobile phone may interact with the NFC tag 701 through an NFC signal, so that the mobile phone reads the NFC card number and the preset flag hit in the NFC tag 701. If the flag bit is 00, it indicates that the NFC tag 701 is not bound to an electronic device. Further, as shown in FIG. 9 the mobile phone may prompt the user to establish binding relationships between the NFC tag 701 and one or more electronic devices.

Figure 9:
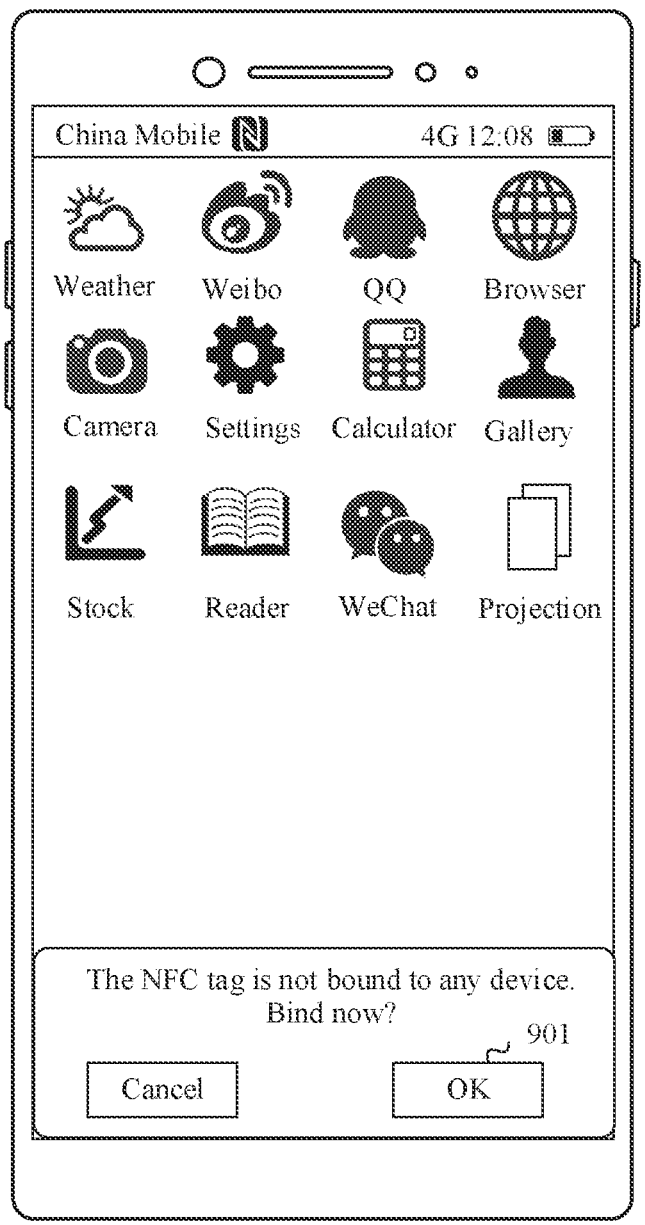
FIG. 9 is a schematic diagram 2 of an application scenario of a cross-device content projection method according to an embodiment of this application.
Figure 10:
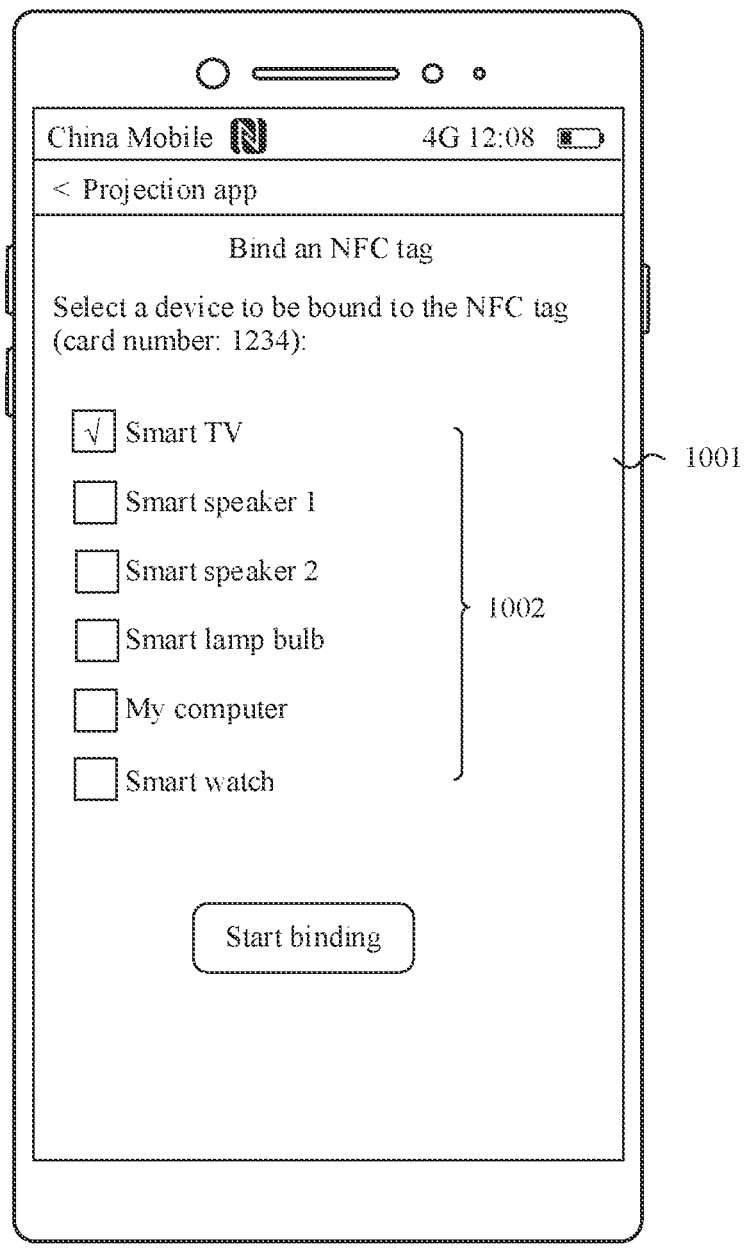
FIG. 10 is a schematic diagram 3 of an application scenario of a cross-device content projection method according to an embodiment of this application.

If it is detected that the user taps an OK button 901 shown in FIG. 9, as shown in FIG. 10, the mobile phone may open the projection application and automatically jump to a binding interface 1001 of the NFC tag 701. In the binding interface 1001, the mobile phone may display a device list 1002 including one or more electronic devices. All the electronic devices in the device list 1002 are devices that may be bound to the NFC tag 701. For example, the electronic devices in the device list 1002 may be one or more devices on which an account (for example, a. Huawei ID) the same as that on the mobile phone is logged in. For another example, the electronic devices in the device; list 1002 may be one or more devices that access a same network as the mobile phone. The user may select, from the device list 1002, an electronic device that needs to be bound to the NFC tag 701.

In this embodiment of this application, the NFC tag 701 may be bound to one or more electronic devices. That is, the user may select one or more electronic devices from the device list 1002 as bound devices of the NFC tag 701.

Figure 11:
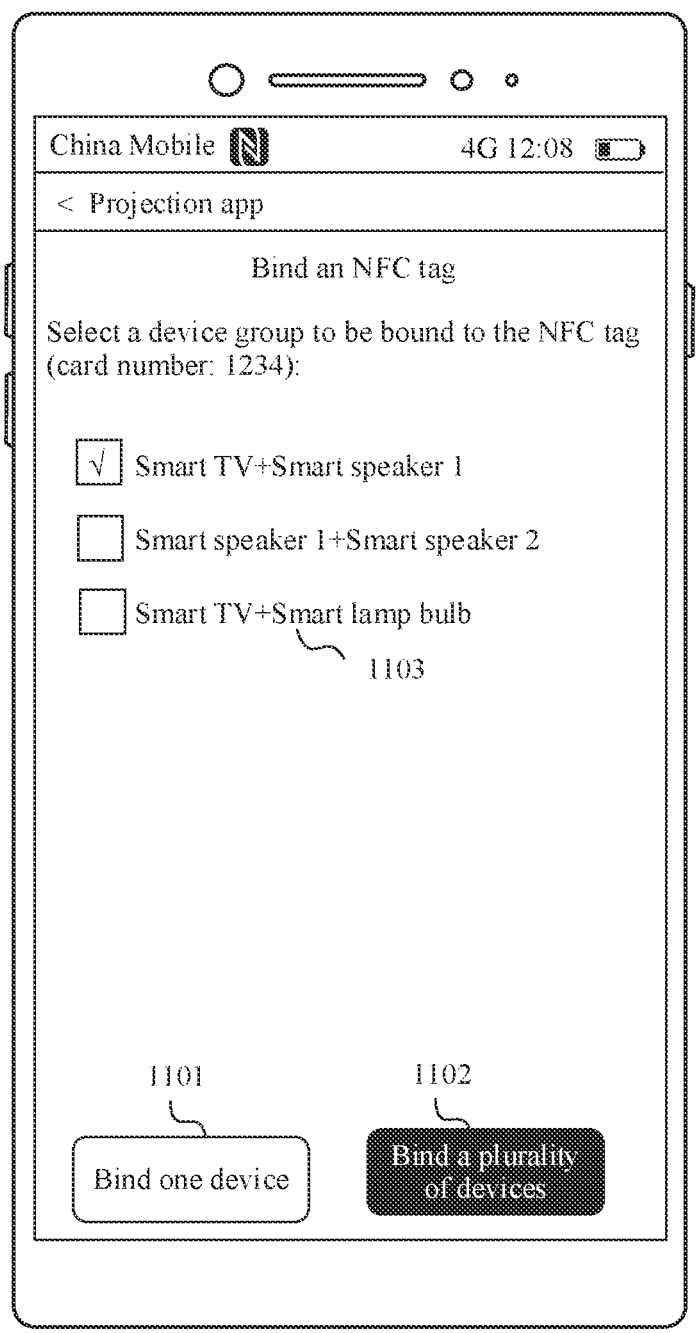
FIG. 11 is a schematic diagram 4 of an application scenario of a cross-device content projection method according to an embodiment of this application.

Alternatively, as shown in FIG. 11, a binding option 1101 of a single electronic device and a binding option 1102 of a plurality of electronic devices may be preset in the projection application. If the user selects the binding option 1101, the mobile phone may prompt, in a corresponding binding interface, the user to select one electronic device from the device list to be bound to the NFC tag 701. If the user selects the binding option 1102, still as shown in FIG. 11, the mobile phone may display one or more preset device groups 1103 in a corresponding binding interface, and each device group includes a plurality of electronic devices. For example, a smart TV and a smart speaker 1 are a device group, the smart speaker 1 and a smart speaker 2 are a device group, and the smart TV and a smart lamp bulb are a device group. In this way, by selecting a device group in the binding interface, the user may trigger the mobile phone to bind the NFC tag 701 to a plurality of electronic devices in the device group.

S802: The mobile phone receives the user's first operation of selecting a bound device in the device list.

In step S802, after the mobile phone displays the binding interface of the projection application, the user may select, from the device list or device groups listed in the binding interface, one or more electronic devices to be bound to the NFC tag 701. The one or more electronic devices selected by the user may be referred to as bound devices of the NFC tag 701. After detecting that the user selects the bound device in the binding interface, the mobile phone may continue to perform the following steps S803 and S804.

S803: in response to the first operation, the mobile phone prompts the user to move the mobile phone to approach the to-be-bound NFC tag 701.

For example, bound devices are a smart TV and a smart lamp bulb. After detecting that the user selects the smart TV and the smart lamp bulb in the binding interface, the mobile phone may determine a binding relationship between the NFC tag 701 and the smart TV and a binding relationship between the NFC tag 701 and the smart lamp bulb. In this case, the mobile phone needs to write the binding relationships into the NFC tag 701, The mobile phone needs to communicate with the NFC tag 701 through a short-distance NFC signal. Therefore, as shown in FIG. 12, if the mobile phone does not detect an NFC signal sent by the NFC tag 701, the mobile phone may display a prompt 1201 in the projection application, and the prompt 1201 indicates the user to move the mobile phone to approach or touch the NFC tag 701 to be bound to the smart TV and the smart lamp bulb.

S804: The mobile phone writes an identifier of the bound device into the NFC tag 701, to establish a binding relationship between the NFC tag 701 and the bound device.

Figure 12:
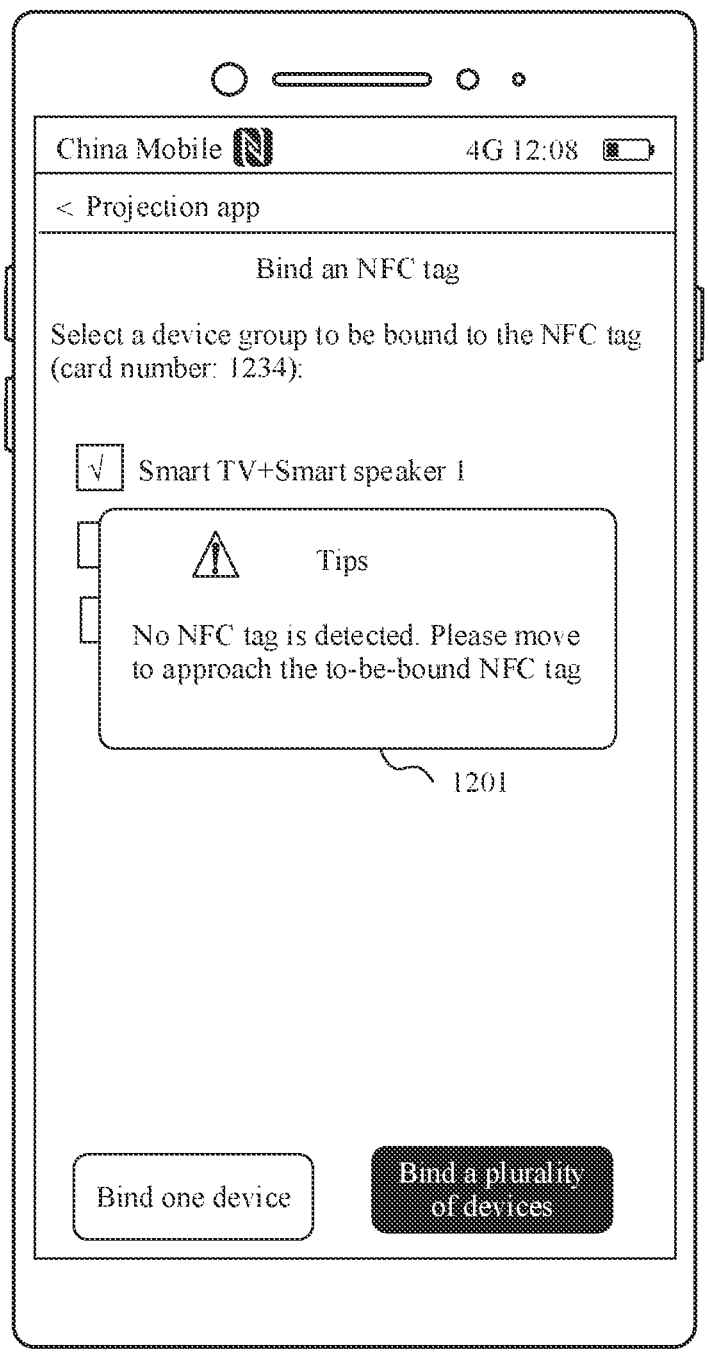
FIG. 12 is a schematic diagram 5 of an application scenario of a cross-device content projection method according to an embodiment of this application.
Figure 13:
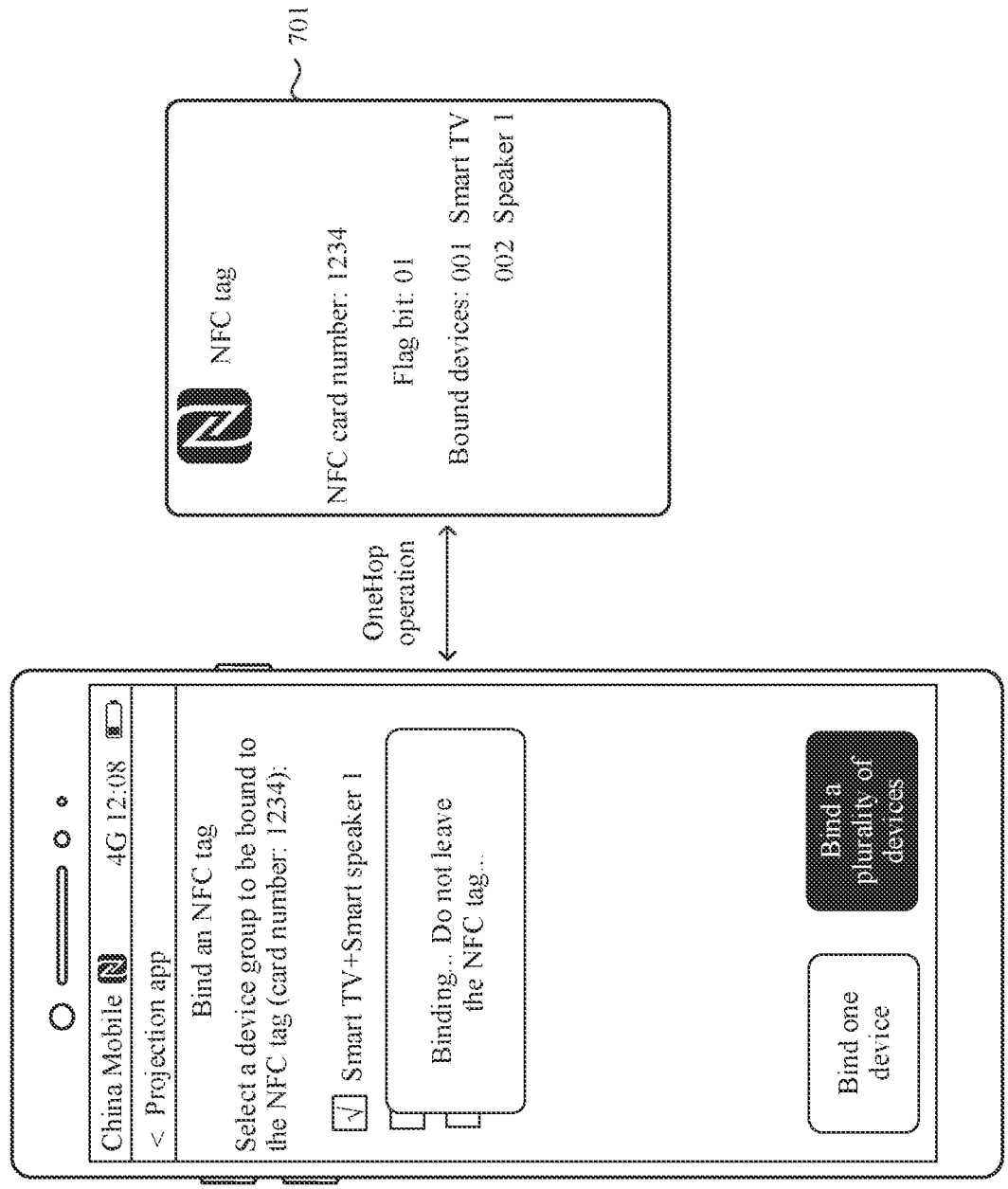
FIG. 13 is a schematic diagram 6 of an application scenario of a cross-device content projection method according to an embodiment of this application.

For example, the user may move the mobile phone to approach or touch the NFC tag 701 based on the prompt shown in FIG. 12. When a distance between the mobile phone and the NFC tag 701 is close enough, the mobile phone may detect the NFC signal sent by the NFC tag 701. Further, as shown in FIG. 13, the mobile phone may write, into the NFC tag 701, the identifier that is of the bound device and that is set by the user in the binding interface. For example, the mobile phone may write a MAC address, a device name, an IP address, or the like of a bound device into the NFC tag 701. In this way, the binding relationship between the NFC, tag 701 and the bound device is established in the NFC tag 701, Subsequently, a source device that projects content, such as the mobile phone, may determine, by reading an identifier of a bound device in the NFC tag 701, one or more electronic devices bound to the NFC tag 701, that is, a target device for content projection.

In addition, after the mobile phone writes the identifier of the bound device into the NFC tag 701, the NFC tag 701 may modify the preset flag bit from 00 to 01, to indicate that the NFC tag 701 is currently bound to one or more electronic devices.

In some embodiments, after the mobile phone writes the identifier of the bound device into the NFC tag 701, the user may continue to set, in the projection application, a projection policy for content projection onto the bound device bound to the NFC tag 701.

Figure 14:
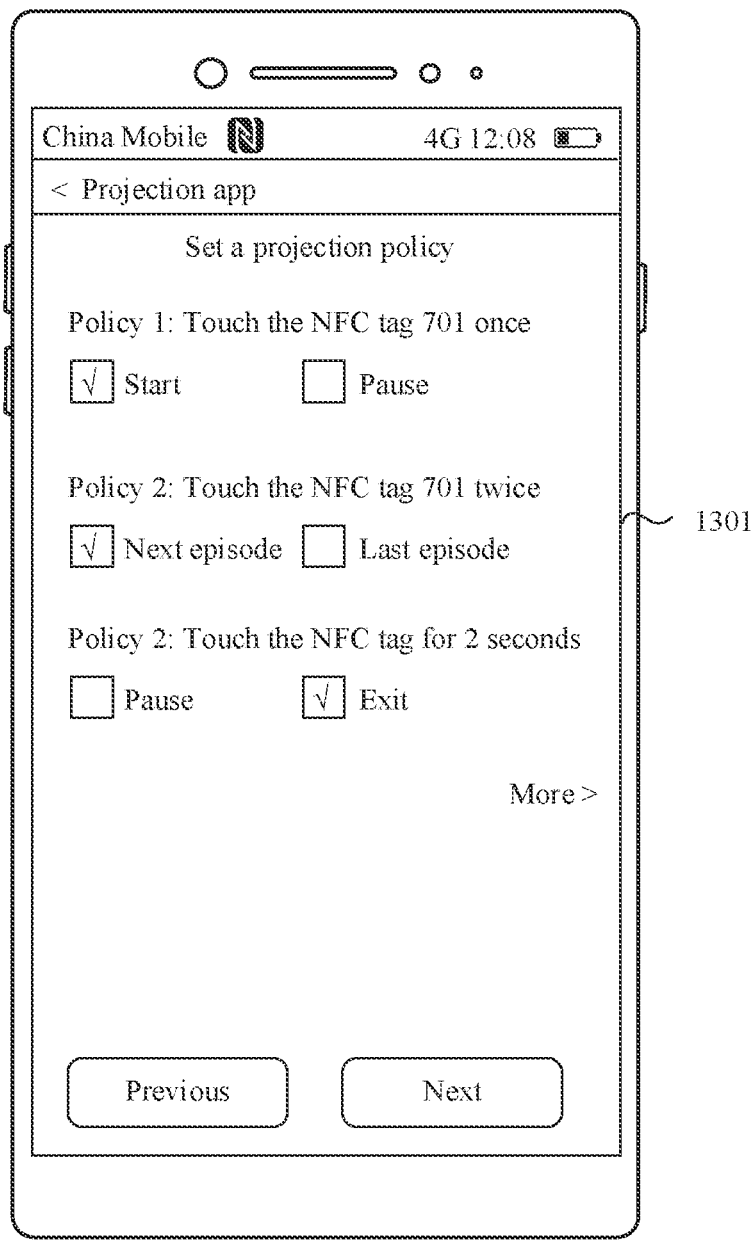
FIG. 14 is a schematic diagram 7 of an application scenario of a cross-device content projection method according to an embodiment of this application.

For example, a bound device of the NFC tag 701 is a smart TV After writing an identifier of the smart TV into the NFC tag 701, the mobile phone may prompt, in the projection application, the user to set a projection policy for content projection onto the smart TV. As shown in FIG. 14, the mobile phone may provide different projection instructions corresponding to different NFC operations in a setting interface 1301 for selection by the user. For example, the user may set that a projection instruction corresponding to touching the NFC tag 701 once is to start projection. For example, the user may set that a projection instruction corresponding to continuously touching the NFC tag 701 twice is to play a next episode (or a next song). For another example, the user may set that a projection instruction corresponding to touching the NFC tag 701 for a period of time longer than preset time is to exit current content projection.

After receiving the projection policy that is set by the user in the setting interface 1301, the mobile phone may establish an association relationship between the NFC tag 701, the smart TV, and the projection policy. Subsequently, the mobile phone may trigger, by approaching or touching the NFC tag 701, the mobile phone to project content onto the smart TV according to the projection policy set by the user, to simplify an operation procedure of cross-device content projection.

Figure 15:
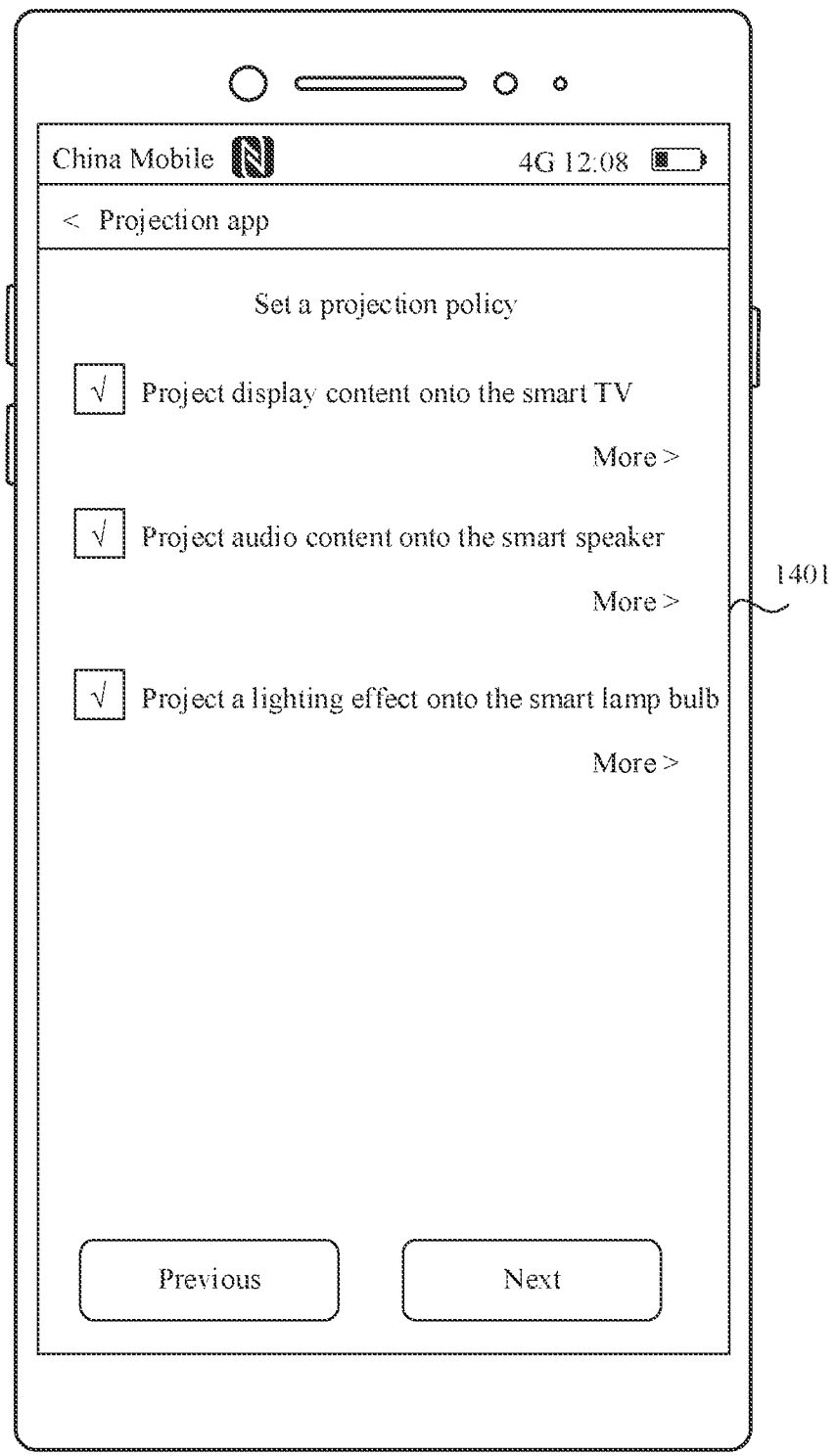
FIG. 15 is a schematic diagram 8 of an application scenario of a cross-device content projection method according to an embodiment of this application.

For example, bound devices of the NFC tag 701 are a smart TV, a smart speaker, and a smart lamp bulb. After writing identifiers of the smart TV, the smart speaker, and the smart lamp bulb into the NFC tag 701, the mobile phone may also prompt, in the projection application, the user to set a projection policy for content projection onto the three bound devices. For example, as shown in FIG. 15, the user may set, in a setting interface 1401, that during content projection onto the smart TV, the smart speaker, and the smart lamp bulb, display content of the source device is projected onto the smart TV for displaying, audio content of the source device is projected onto the smart speaker for playing, and the smart lamp bulb may change a lighting effect based on the display content or the audio content. Certainly, the user may further set a specific projection policy for projecting the display content onto the smart TV, a specific projection policy for projecting the audio content onto the speaker, and the like. This is not limited in this embodiment of this application.

Similarly, after receiving the projection policy that is set by the user in the setting interface 1401, the mobile phone may establish an association relationship between the NFC tag 701, the bound devices (the smart TV, the smart speaker, and the smart lamp bulb), and the projection policy. Subsequently, the mobile phone may trigger, by approaching or touching the NFC tag 701, the mobile phone to project content onto the three bound devices according to the projection policy set by the user, to simplify an operation procedure of cross-device content projection.

It should be noted that, the projection policy for content projection onto the bound device of the NFC tag 701 may be manually set by the user by using the projection application, or may be preset by the mobile phone based on information such as a type, a location, and a device capability of the bound device. For example, when bound devices of the NFC tag 701 are a smart speaker 1 and a smart speaker 2, the mobile phone may consider, by default, that the projection policy is to project content onto a smart speaker closest to the user.

In some other embodiments, the projection policy may also be dynamically set by the source device during content projection onto a bound device of the NFC tag 701. For example, when projecting content onto bound devices (for example, a smart TV and a smart speaker) of the NFC tag 701, the mobile phone may dynamically obtain audio play capabilities of the smart TV and the smart speaker. Further, the mobile phone may determine, based on the audio play, capabilities of the smart TV and the smart speaker, to project audio content onto the smart TV and/or the smart speaker. Specific content of the projection policy and a specific setting manner of the projection policy are not limited in this embodiment of this application.

For example, the user may separately set one or more corresponding bound devices for different NFC tags according to the foregoing method. When the user is to project content onto a bound device or a group of bound devices, the user may enable the NFC function of the source device and make the source device approach or touch a corresponding NFC tag, so that one or more bound devices in the NFC tag are used as target devices for current content projection, to start a content projection process.

Figure 16:
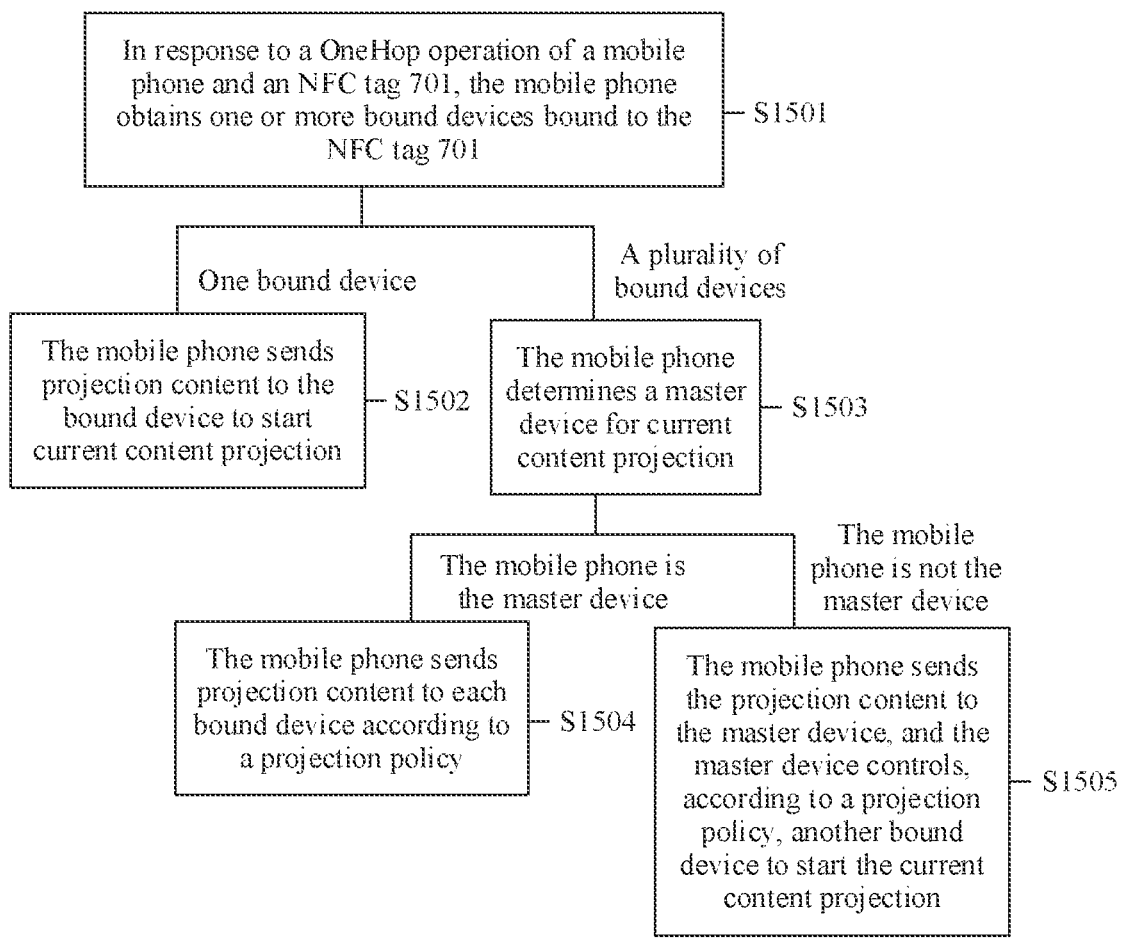
FIG. 16 is a schematic flowchart 2 of a cross-device content projection method according to an embodiment of this application.

The following describes, by using an example in which a mobile phone is a source device, a method in which the mobile phone projects content onto a target device by touching the NFC tag 701. As shown in FIG. 16, the method may include the following steps.

S1501: In response to a OneHop operation of the mobile phone and the NFC tag 701, the mobile phone obtains one or more bound devices bound to the NFC tag 701.

Figure 17:
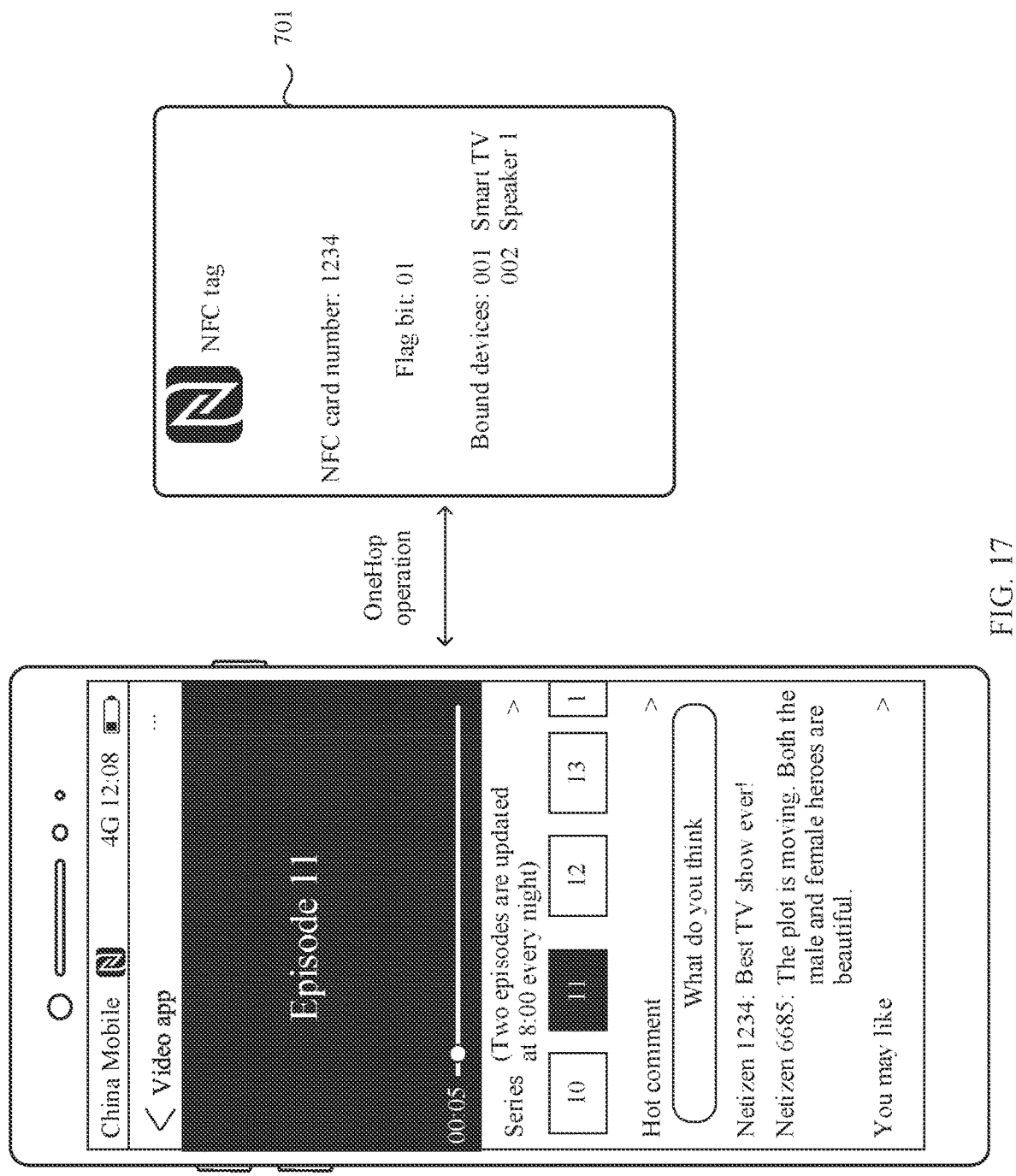
FIG. 17 is a schematic diagram 9 of an application scenario of a cross-device content projection method according to an embodiment of this application.

For example, by using steps S801 to S804, the mobile phone has set a corresponding bound device for the NFC tag 701. Then, when a user expects to project content (for example, display content and audio content) in the mobile phone (namely, the source device) onto a bound device of the NFC tag 701, as shown in FIG. 17, the user may enable an NFC function of the mobile phone to touch (or approach) the NFC tag 701, that is, perform the OneHop operation of the mobile phone and the NFC tag 701.

In response to the OneHop operation of the mobile phone and the NFC tag 701, the mobile phone may read, from the NFC tag 701, identifiers of one or more bound devices that have been bound to the NFC tag 701, and the bound devices may serve as target devices of the mobile phone to participate in current content projection. That is, the OneHop operation that the user uses the source device to touch the NFC tag may trigger the source device to obtain the target device participating in the current content projection, to automatically complete a subsequent process of content projection onto the target device. This simplifies an operation procedure during the content projection and improves efficiency of collaboration between a plurality of devices.

Certainly, if the NFC tag 701 does not store an identifier of a bound device, the mobile phone may establish a correspondence between the NFC tag 701 and a corresponding bound device by performing steps S801 to S804.

S1502: When the bound device of the NFC tag 701 is one electronic device, the mobile phone sends projection content to the bound device to start the current content projection.

When the mobile phone reads an identifier of only one bound device of the NFC, tag 701, it indicates that the NFC tag 701 is bound to only one bound device. Therefore, the target device for the current content projection is the bound device.

Figure 18:
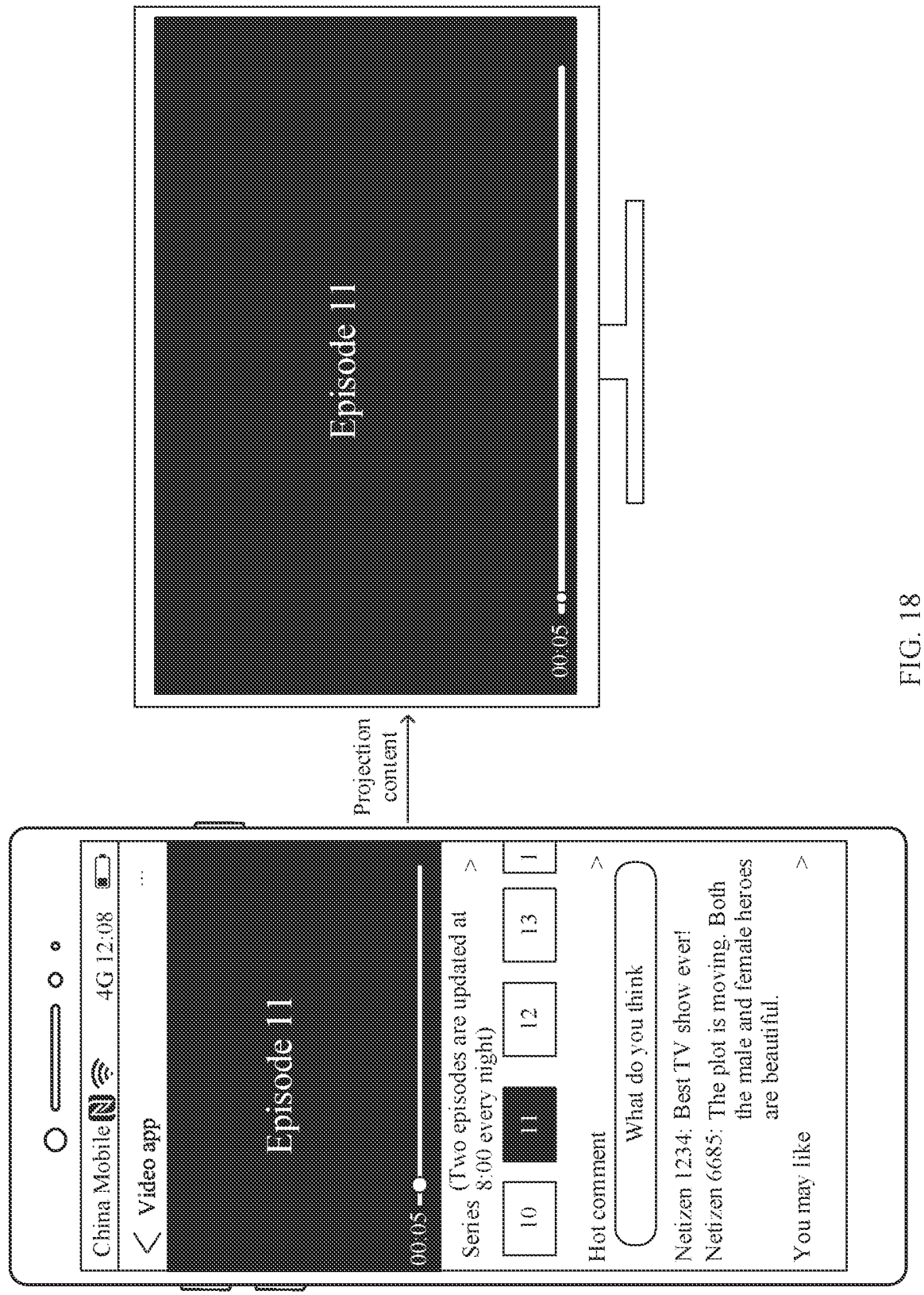
FIG. 18 is a schematic diagram 10 of an application scenario of a cross-device content projection method according to an embodiment of this application.

For example, the bound device is a smart TV. After the mobile phone reads an identifier of the smart TV in the NFC tag 701, as shown in FIG. 18, the mobile phone may use the smart TV as the target device for the current content projection, and send the current projection content to the smart TV, to start the content projection. The projection content may include content that is being played by the mobile phone, for example, audio content and/or display content being played by the mobile phone. The display content may include a picture, an image in a video, some or all content of a current display interface, or the like.

For example, the mobile phone may query, based on the identifier of the smart TV, whether a currently accessed Wi-Fi network includes the smart TV. If the smart TV is included, it indicates that the smart TV has accessed the Wi-Fi network. In this case, the mobile phone may, dynamically send the projection content to the smart TV through the Wi-Fi network. If the smart TV is not included, it indicates that the smart TV does not access the Wi-Fi network in which the mobile phone is located, and the mobile phone may prompt the user to connect the smart TV to the same Wi-Fi network in which the mobile phone is located. Further, the mobile phone may dynamically send the projection content to the smart TV through the Wi-Fi network.

Alternatively, if the Wi-Fi network in which the mobile phone is located does not include the smart TV, the mobile phone may automatically establish a wireless communications connection to the smart TV based on the read identifier of the smart TV (for example, a. MAC address of the smart TV). For example, the mobile phone may establish a Bluetooth connection or a Wi-Fi P2P connection to the smart TV. This is not limited in this embodiment of this application.

In addition, the projection content sent by the mobile phone to the smart TV may include the display content of the mobile phone. For example, the mobile phone may send, to the smart TV through screen mirroring, each frame of image displayed in real time, and the smart TV synchronously displays a display interface of the mobile phone. For another example, the mobile phone may send, through DLNA (digital living network alliance. Digital Living Network Alliance) projection, some display content such as a video and a picture in a display interface of the mobile phone to the smart TV for displaying.

For example, when the mobile phone touches or approaches the NFC tag 701, if the mobile phone is displaying a play interface of a video A, when the bound device of the NFC tag 701 is a smart TV, the mobile phone may serve as a source device to send the entire play interface (that is, all content displayed in the display interface) as projection content to the smart TV, or the mobile phone may serve as a source device to send a video image (that is, some content displayed in the display interface) of the video A as projection content to the smart TV.

For another example, when the mobile phone touches or approaches the NFC tag 701, if the mobile phone is displaying a playlist of a video app, when the bound device of the NFC tag 701 is a smart TV, the mobile phone may also serve as a source device to send, to the smart TV, the playlist that is being displayed as projection content. Subsequently, if the mobile phone detects that the user chooses to play a video A in the playlist, the mobile phone may continue to send a play interface of the video A or a video image of the video A as projection content to the smart TV.

Certainly, the projection content sent by the mobile phone to the smart TV may also include audio content that is being played by the mobile phone. For example, the audio content may be an audio file corresponding to a video picture that is being displayed by the mobile phone. After receiving the projection content sent by the mobile phone in real time, the smart TV may display or play the projection content, to complete the current content projection.

In some embodiments, still in an example in which the target device for the current content projection is a smart TV, in a process in which the mobile phone projects content onto the smart. TV, the user may trigger, through interaction between the mobile phone and the NFC tag 701, the mobile phone to send a corresponding projection instruction to the smart TV, so as to implement a corresponding control function in the content projection process.

For example, when setting a bound device for the NFC tag 701 in a projection application, the user may preset a projection policy associated with the NFC tag 701 and the bound device. For example, the projection policy includes different projection instructions corresponding to different NFC operations. For example, the user may set that a projection instruction corresponding to an NFC operation of continuously touching the NFC tag 701 twice by the mobile phone is to play a next episode (or a next song).

Then, in a process in which the mobile phone projects content onto the smart TV, if the mobile phone detects that the user performs an operation of continuously touching the NFC tag 701 twice, the mobile phone may send, to the smart TV, a projection instruction to play a next episode (or a next song). The smart TV may perform an operation of playing a next episode (or a next song) in response to the projection instruction, That is, in the content projection process, the user may use the source device to perform different NFC operations on the NFC tag, to implement corresponding control functions. This enriches user experience in a content projection scenario.

S1503: When the bound device of the NFC tag 701 is a plurality of electronic devices, the mobile phone determines a master device for the current content projection.

The master device (master) for the current content projection may be the source device (namely, the mobile phone), or may be one of the plurality of bound devices bound to the NFC tag 701. The master device may serve as a control node to connect to and interact with another device (namely, a slave device) by using a star topology.

In some embodiments, when the NFC tag 701 has a plurality of bound devices, the mobile phone may determine a specific master device based on information such as device types and device capabilities of the plurality of hound devices. For example, the mobile phone may, query computing capabilities of the plurality of bound devices, and determine a bound device having a strongest computing capability as the master device for the current content projection. In this case, the mobile phone and another bound device may serve as slave devices of the master device.

In some other embodiments, specific master devices corresponding to different content projection scenarios may be preset in the mobile phone. For example, it may be set that when the bound devices are a smart TV and a smart lamp bulb, the master device is the smart TV, and slave devices are the mobile phone and the smart lamp bulb. For another example, it may be set that when the bound devices are a smart speaker 1 and a smart speaker 2, the master device is the mobile phone, and slave devices are the smart speaker 1 and the smart speaker 2. For another example, it may be set that when the bound devices are a smart TV and a smart speaker, the master device is the mobile phone, and slave devices are the smart TV and the smart speaker. In this case, the mobile phone may determine, based on identifiers of the plurality of bound devices read from the NFC tag 701, a specific master device corresponding to a content projection scenario including the plurality of bound devices.

S1504: If the mobile phone is the master device, the mobile phone sends projection content to each bound device according to a projection policy.

If the mobile phone determines that the master device for the current content projection is the mobile phone (namely, the source device), the mobile phone may serve as a control node of the current content projection, and send the current projection content to each bound device (namely, the target device) in real time according to the specific projection policy, so that each bound device starts to play or display the projection content after receiving the projection content. The projection policy may be preset by the user when the user binds the NFC tag 701, or may be preset by the mobile phone based on information such as device types and device capabilities of the bound devices, or may be dynamically generated by the mobile phone after the mobile phone determines that the mobile phone is the master device. This is not limited in this embodiment of this application.

Figure 19:
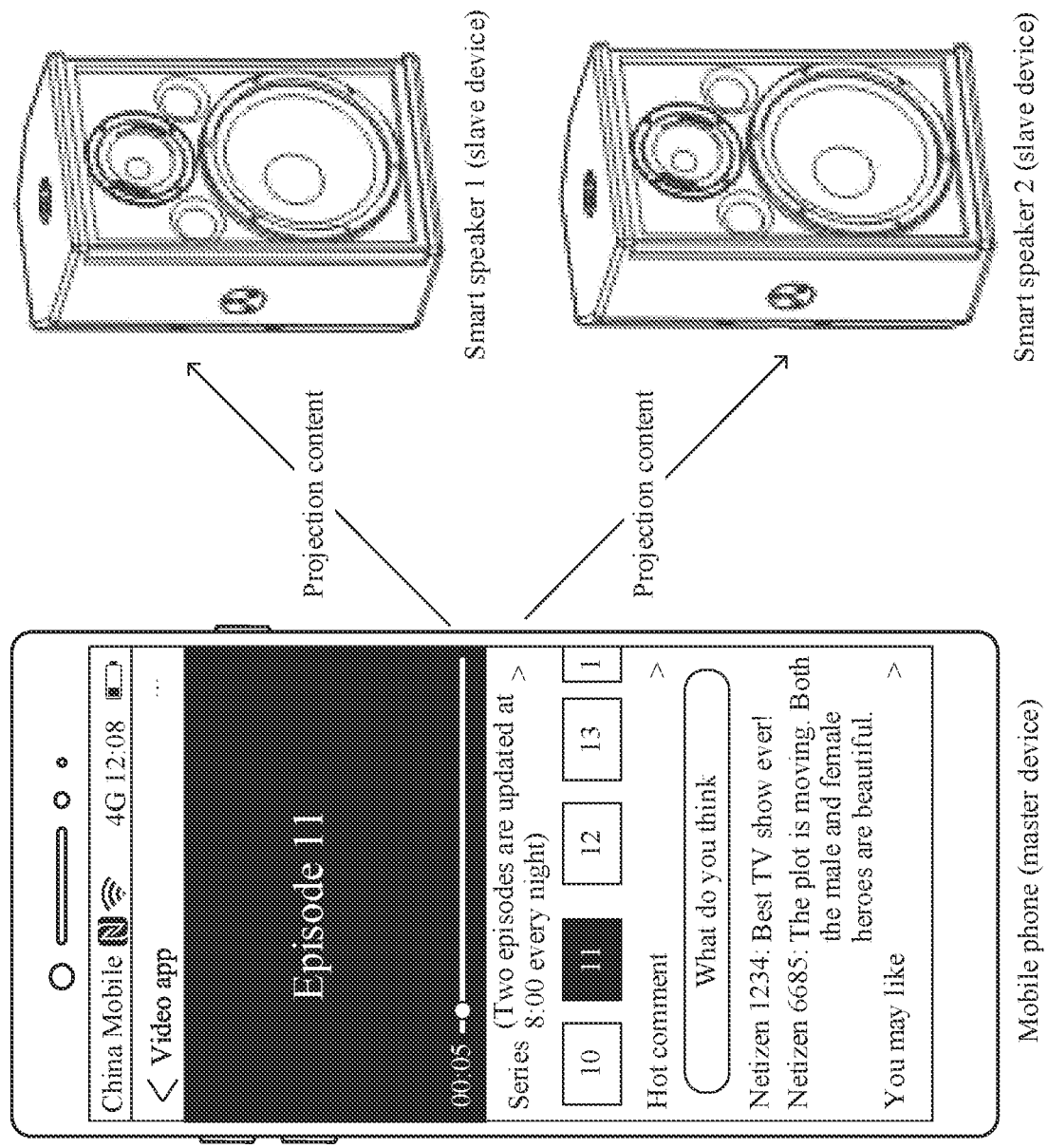
FIG. 19 is a schematic diagram 11 of an application scenario of a cross-device content projection method according to an embodiment of this application.

For example, as shown in FIG. 19, when the bound devices of the NFC tag 701 are a smart speaker 1 and a smart speaker 2, the mobile phone may serve as the master device when projecting content onto the smart speaker 1 and the smart speaker 2, and the smart speaker 1 and the smart speaker 2 may serve as slave devices of the mobile phone. In this projection scenario, a projection policy may be set to be related to a distance between the mobile phone and the smart speaker 1 and a distance between the mobile phone and the smart speaker 2.

For example, the mobile phone may detect the distance between the mobile phone and the smart speaker 1 and the distance between the mobile phone and the smart speaker 2. When the distance between the mobile phone and the smart speaker 1 is less than a preset value, and the distance between the mobile phone and the smart speaker 2 is greater than the preset value, it indicates that the user is closer to the smart speaker 1 and farther from the smart speaker 2. In this case, the mobile phone serving as the master device may send the current projection content to the smart speaker 1, and the smart speaker 1 plays the current projection content to complete the content projection. Certainly, the mobile phone may alternatively send, by default, the current projection content to a smart speaker that is closest to the mobile phone.

Alternatively, if the distances between the mobile phone and both the smart speaker 1 and the smart speaker 2 are less than a preset value, it indicates that the user is close to both the smart speaker 1 and the smart speaker 2. In this case, the mobile phone may separately send the projection content to the smart speaker 1 and the smart speaker 2 according to a projection policy for stereo sound playing. For example, the mobile phone may send a low frequency component in the projection content to the smart speaker 1, and the smart speaker 1 plays the low frequency component in the projection content. Simultaneously, the mobile phone may send a high frequency component in the projection content to the smart speaker 2, and the smart speaker 2 plays the high frequency component in the projection content. For another example, the mobile phone may send an audio file corresponding to a left sound channel in the projection content to the smart speaker 1, and simultaneously send an audio file corresponding to a right sound channel in the projection content to the smart speaker 2, so that the smart speaker 1 and the smart speaker 2 respectively play the audio file corresponding to the left sound channel and the audio file corresponding to the right sound channel in the projection content. Certainly, if the bound devices further include more smart speakers other than the smart speaker 1 and the smart speaker 2, the mobile phone may send a corresponding audio component in the current projection content to each smart speaker according to the foregoing method, so that the plurality of speakers each play the received audio component, to implement a play effect of stereo sound or surround sound.

For example, before sending the projection content to the smart speaker 1 and the smart speaker 2, the mobile phone may further send a synchronization instruction to the smart speaker 1 and the smart speaker 2. The smart speaker 1 and the smart speaker 2 may synchronize time with the mobile phone based on the synchronization instruction, to ensure that play progress on the smart speaker 1 is the same as that on the smart speaker 2. For example, the mobile phone may mark one or more timestamps in the to-be-sent projection content, and send both the projection content and the timestamps in the projection content to the smart speaker 1 and the smart speaker 2. After the smart speaker 1, the smart speaker 2, and the mobile phone synchronize time with each other, time of the three devices is synchronized. Therefore, the smart speaker 1 and the smart speaker 2 may play each piece of projection content based on the timestamp in the projection content, to ensure that the play progress on the smart speaker 1 is the same as that on the smart speaker 2.

In addition, the mobile phone may further calculate transmission delays generated when the smart speaker 1 and the smart speaker 2 respond to the synchronization instruction. For example, a transmission delay generated when the smart speaker 1 responds to the synchronization instruction is 300 ms, and a transmission delay generated when the smart speaker 2 responds to the synchronization instruction is 500 MS. In this case, the mobile phone may separately calculate the distance between the mobile phone and the smart speaker 1 and the distance between the mobile phone and the smart speaker 2 based on the transmission delays. Certainly, the mobile phone may alternatively detect the distance between the mobile phone and the smart speaker 1 and the distance between the mobile phone and the smart speaker 2 by using a distance sensor, an infrared sensor, or the like. This is not limited in this embodiment of this application.

In some embodiments, to ensure that the smart speaker 1 and the smart speaker 2 can synchronously play the projection content sent by the mobile phone, the mobile phone may further separately send projection content to the smart speaker 1 and the smart speaker 2 based on the transmission delays of the smart speaker 1 and the smart speaker 2. Still in an example in which the transmission delay of the smart speaker 1 is 300 ms and the transmission delay of the smart speaker 2 is 500 ms, the mobile phone may send projection content to the smart speaker 2 200 ms before sending the same projection content to the smart speaker 1. In this way, the smart speaker 1 and the smart speaker 2 can simultaneously receive the projection content sent by the mobile phone and start content projection.

Alternatively, still as shown in FIG. 19, when the mobile phone is the master device for the current content projection, and the smart speaker 1 and the smart speaker 2 are slave devices of the mobile phone, the mobile phone may display a projection policy setting interface. The user may manually set, in the setting interface, a smart speaker that is used to play the projection content sent by the mobile phone during the current content projection. In addition, the mobile phone may store a projection policy that is set by the user for the mobile phone, the smart speaker 1, and the smart speaker 2. Subsequently, when the mobile phone serves as the master device again to project content onto the smart speaker 1 and the smart speaker 2, the mobile phone may project content according to the stored projection policy. That is, during content projection, the user may manually set a corresponding projection policy for a plurality of devices participating in the current content projection.

Figure 20:
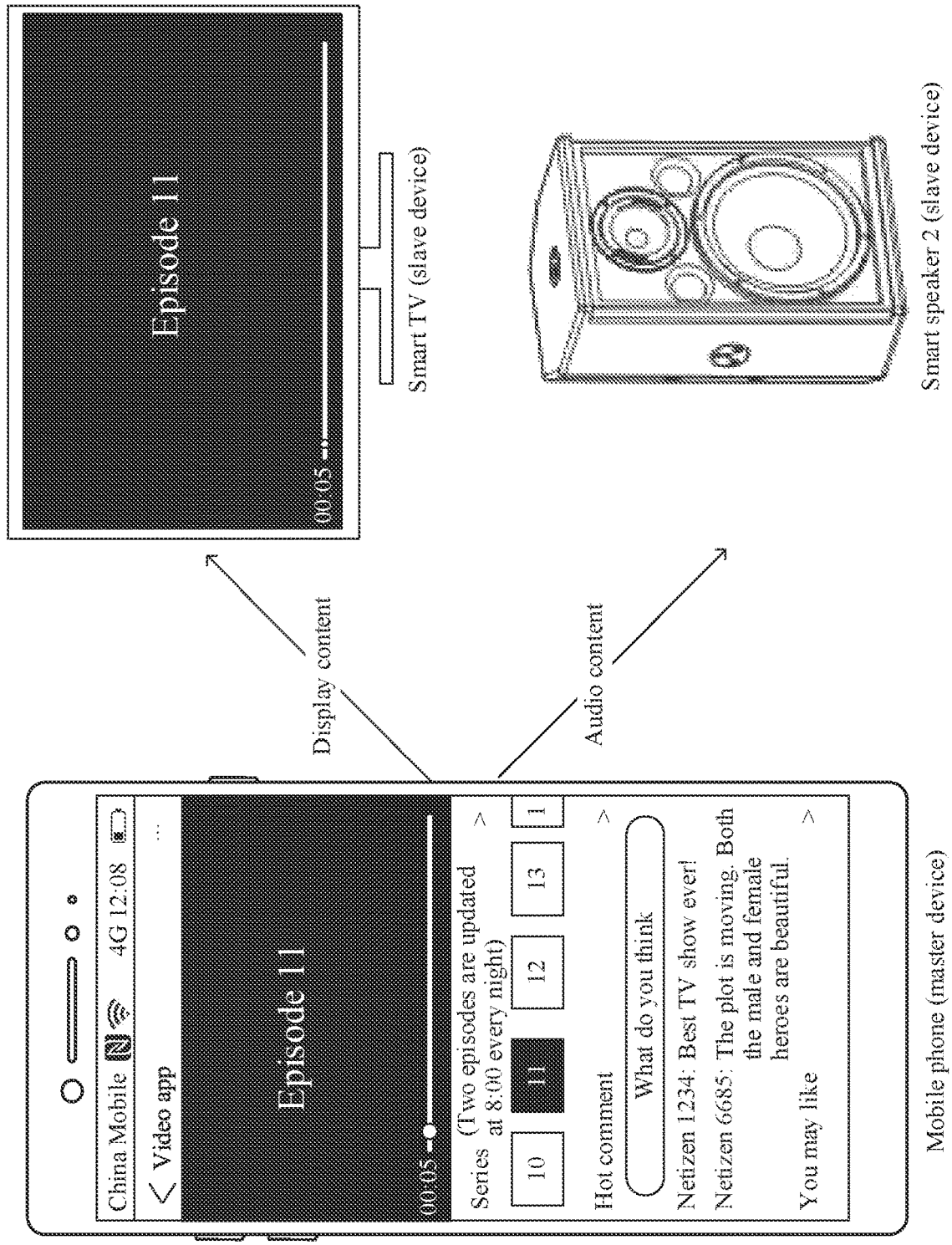
FIG. 20 is a schematic diagram 12 of an application scenario of a cross-device content projection method according to an embodiment of this application.

For example, as shown in FIG. 20, when the bound devices of the NFC tag 701 are a smart TV and a smart speaker, the mobile phone may serve as the master device when projecting content onto the smart TV and the smart speaker, and the smart TV and the smart speaker may serve as slave devices of the mobile phone. In this projection scenario, the projection policy may be set to: The smart TV plays display content in the projection content, and the smart speaker plays audio content in the projection content.

In this case, the mobile phone may serve as the master device to send the display content in the current projection content to the smart TV, and the smart TV starts to display the display content. Simultaneously, the mobile phone may send the audio content in the current projection content to the smart speaker, and the smart speaker starts to play the audio content.

Alternatively, the mobile phone may serve as the master device to send the display content and the audio content in the current projection content to the smart TV, and the smart TV plays the display content and the audio content. Simultaneously, the mobile phone may send the audio content in the current projection content to the smart speaker, and the smart speaker starts to play the audio content. That is, the smart TV and the smart speaker may simultaneously play the audio content in the current projection. There may be one or more smart TVs, and there may also be one or more smart speakers. This is not limited in this embodiment of this application.

Similarly, to ensure that the display content displayed by the smart TV is synchronized with the audio content played by the smart speaker, before sending the display content and the audio content to the smart TV and the smart speaker, the mobile phone may, synchronize time with the smart TV and the smart speaker. In this way, the mobile phone may respectively send, to the smart TV and the smart speaker, the display content and the audio content to which timestamps are added, so that the smart TV and the smart speaker can synchronously perform content projection based on the timestamps.

Alternatively, the projection policy used when the mobile phone projects content onto the smart TV and the smart speaker may be dynamically set. For example, the mobile phone may serve as the master device to obtain device capabilities of the smart TV and the smart speaker. For example, the smart TV has a display capability and an audio play capability, and the smart speaker has an audio play capability. The mobile phone may dynamically determine to project the display content in the current projection content onto the smart TV for displaying, and simultaneously project the audio content in the current projection content onto the smart TV and the smart speaker for playing. Further, the mobile phone may serve as the master device to send the display content and the audio content in the current projection content to the smart TV, and simultaneously send the audio content in the current projection content to the smart speaker.

S1505: If the mobile phone is not the master device, the mobile phone sends the projection content to the master device, and the master device controls, according to a projection policy, another bound device to start the current content projection.

If the mobile phone determines that the master device for the current content projection is one of the plurality of bound devices of the NFC tag 701, the mobile phone may send the current projection content to the master device, and the master device controls, according to the specific projection policy, other bound devices to start content projection.

Figure 21A:
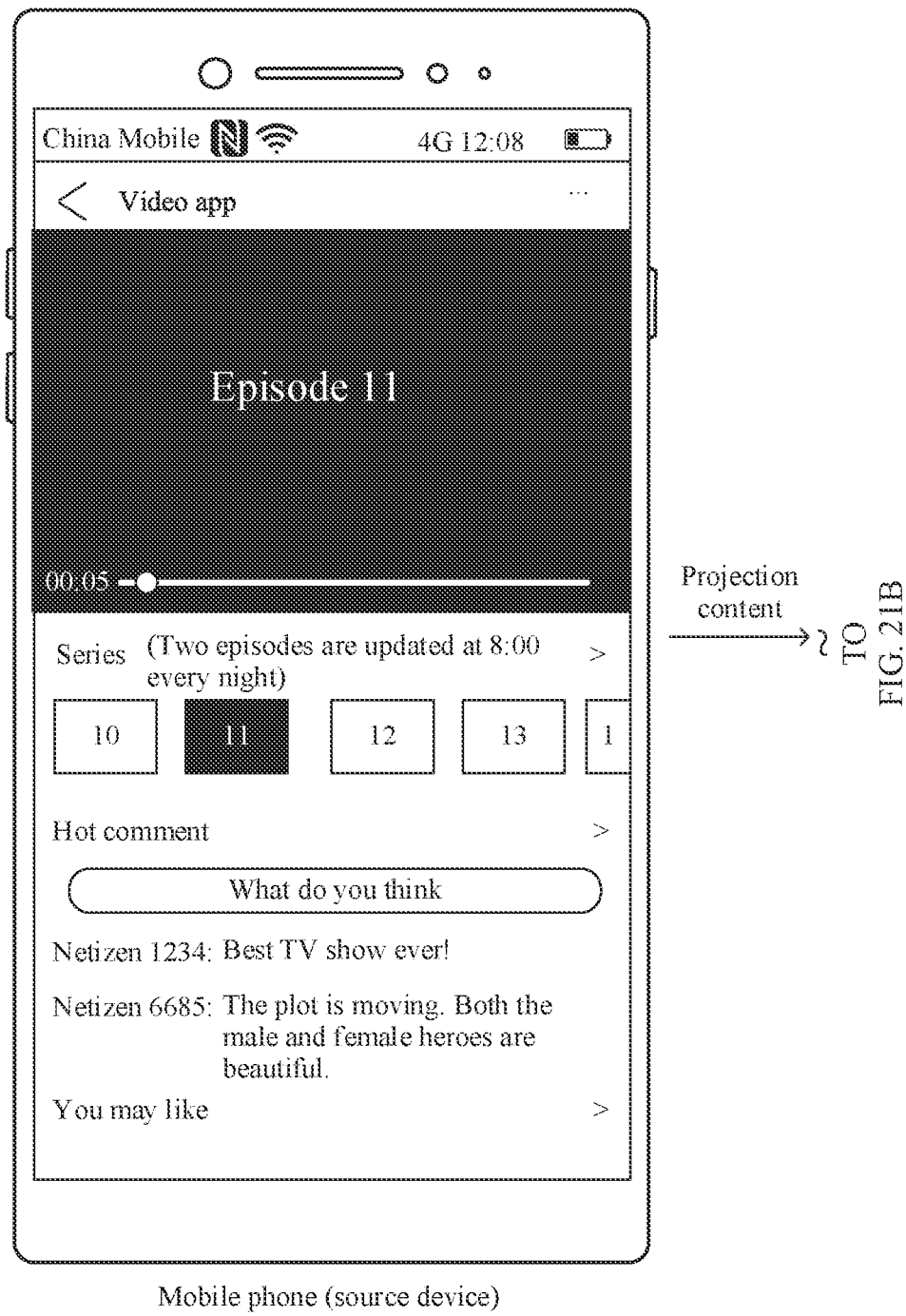
FIG. 21A and FIG. 21B are a schematic diagram 13 of an application scenario of a cross-device content projection method according to an embodiment of this application.
Figure 21B:
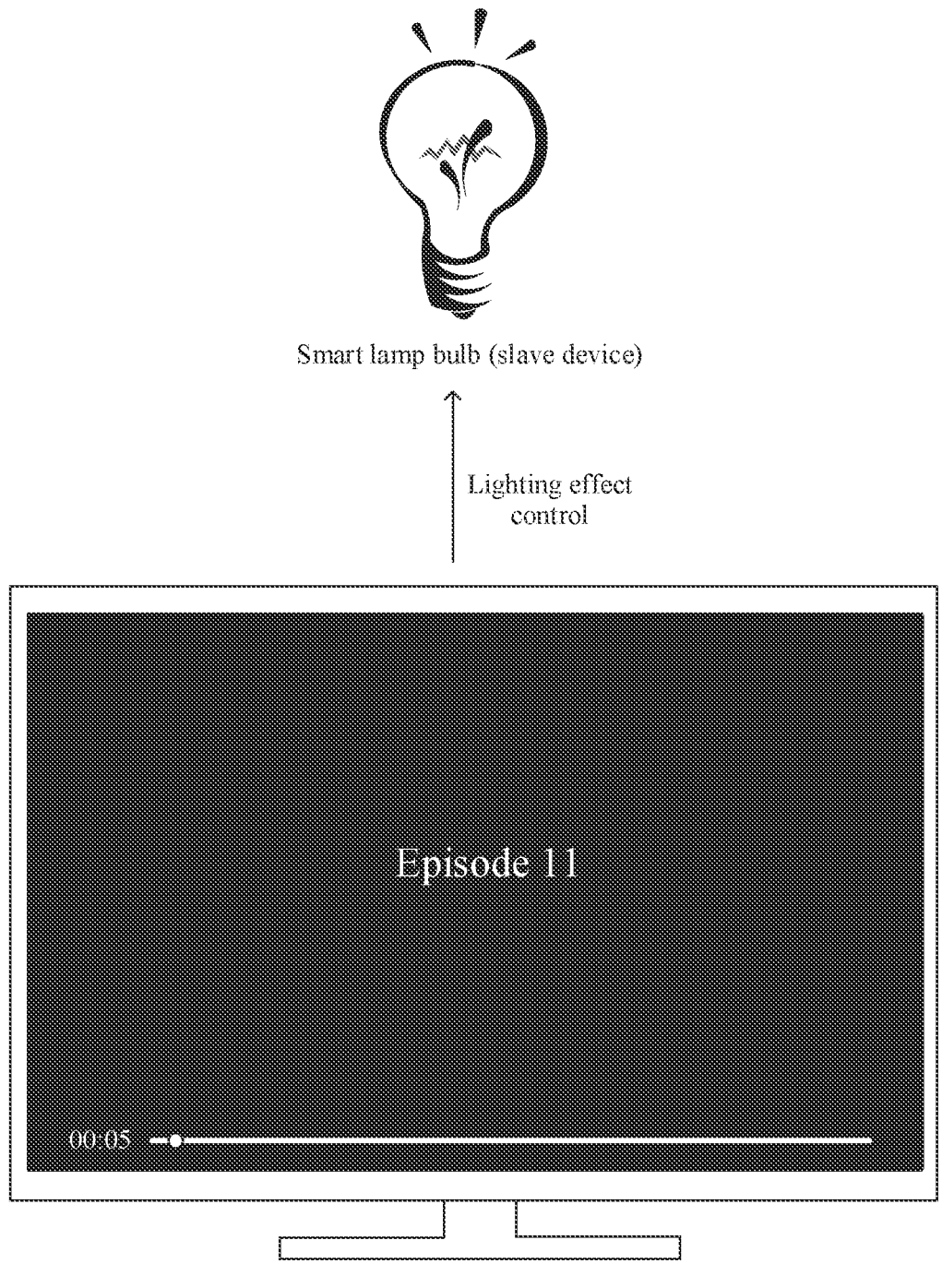

For example, as shown in FIG. 21A and FIG. 21B, when bound devices of the NFC tag 701 are a smart. TV and a smart lamp bulb, the smart TV may serve as the master device for the content projection, and the smart lamp bulb may serve as a slave device of the smart TV. In this projection scenario, the projection policy may be set to: The smart TV displays and plays the projection content, and the smart TV controls a lighting effect of the smart lamp bulb.

In this case, the mobile phone (namely, the source device) may send, to the smart TV (namely, the master device), the projection content that needs to be projected currently. Certainly, the mobile phone may also send the projection policy for the current content projection to the smart TV.

Alternatively, a projection policy used when the slave device is the smart lamp bulb may be prestored in the smart TV. This is not limited in this embodiment of this application. Further, the smart TV may serve as the master device to start to display and play the projection content sent by the mobile phone. Simultaneously, the smart TV may send a corresponding control instruction to the smart lamp bulb based on the projection content, so that the smart lamp bulb emits different lighting effects in the content projection process.

For example, when the smart TV starts to display and play the projection content, the smart. TV may send a turn-off instruction to the smart lamp bulb, to control the smart lamp bulb to turn off a light source. For another example, the smart TV may obtain a type of a video that is being played. If a horror video is being played, the smart TV may control the smart lamp bulb to display a blue light source. If a romance video is being played, the smart TV may control the smart lamp bulb to display a pink light source, and the like, so that the user obtains good scenario experience in the content projection process.

In some other embodiments, when the mobile phone learns, by reading the NFC tag 701, that a plurality of bound devices are bound to the NFC tag 701, the mobile phone may also consider the mobile phone as the master device in the current content projection process by default. In this case, the mobile phone does not need to perform steps S1503 and S1505, and may send the projection content to each bound device according to a projection policy by using a related method in step S1504, to complete the current content projection.

It can be learned that, in the content projection method provided in this embodiment of this application, the user can conveniently and quickly project, by touching the NFC tag, projection content in the source device to a target device required by the user, to implement a function of "OneHop projection". In addition, the source device may simultaneously project the projection content onto a plurality of target devices at a time, and different projection effects are implemented in different projection scenarios by collaboration and cooperation between the plurality of target devices, to improve user experience and working efficiency of collaboration between a plurality of devices.

In some embodiments, after the user sets, in the projection application on the mobile phone, a bound device of the NFC tag 701, the mobile phone may further back up a binding relationship between the NFC tag 701 and the bound device to an application server of the projection application. For example, the mobile phone may send, to the application server, the NFC card number of the NFC tag 701 and the identifiers of the one or more bound devices bound to the NFC tag 701, so that the application server establishes a binding relationship between the NFC tag 701 and a corresponding bound device.

In this way, when the user changes a mobile phone (that is, a source device), the user may install and log in to the projection application on the new source device, and the new source device may obtain the binding relationship between the NFC tag 701 and the corresponding bound device from the application server of the projection application. Then, when the user uses the new source device to touch the NFC tag 701, the new source device may also perform steps S1501 to S1505 to project content onto the corresponding bound device.

In some embodiments, after setting the bound device of the NFC tag 701 and the projection policy in the projection application on the mobile phone, the user may further share the NFC tag 701, the corresponding bound device, and the corresponding projection policy with another user. For example, a user A may share the NFC tag 701, the bound device, and the projection policy with a family member (for example, a parent of the user A) of the user A through WeChat or the like. Then, after receiving the shared content, a mobile phone of the parent of the user A may store a correspondence between the NFC tag 701, the bound device, and the projection policy. Subsequently, when the parent of the user A uses the mobile phone of the parent to touch the NFC tag 701, the mobile phone may also perform S1501 to S1505 to project content onto the corresponding bound device.

In addition, when setting the projection policy for the device bound to the NFC tag 701, the user may further set specific projection content, projection time, and the like in the projection policy. For example, the user may set, for a child of the user, projection content corresponding to the NFC tag 701 to a learning video A and projection time to one hour. In this case, when the user uses the mobile phone of the user to touch the NFC tag 701, or the user shares the projection policy with the parent, and the parent uses the mobile phone of the parent to touch the NFC tag 701, the mobile phone may project content onto a corresponding bound device based on the projection content and the projection time that are set by the user in the projection policy, so that the mobile phone can pertinently complete current content projection, to reduce operation difficulty when the elderly and children project content.

Embodiments of this application disclose an electronic device, including a processor, and a memory, a communications interface, an input device, and an output device that are connected to the processor. The input device and the output device may be integrated into one device. For example, a touch sensor may be used as an input device, a display may be used as an output device, and the touch sensor and the display may be integrated into a touchscreen.

Figure 22:
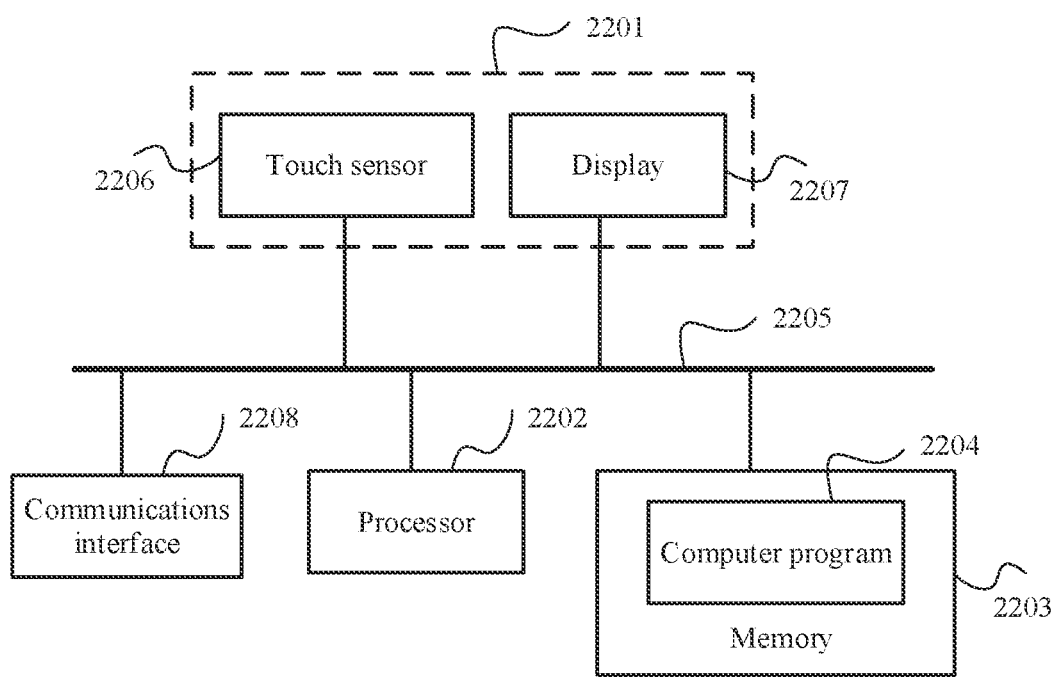
FIG. 22 is a schematic diagram 2 of a structure of an electronic device according to an embodiment of this application.

In this case, as shown in FIG. 22, the electronic device may include a touchscreen. 2201, one or more processors 2202, a memory 2203, one or more applications (not shown), a communications interface 2208, and one or more computer programs 2204. The touchscreen 2201 includes a touch sensor 2206 and a display 2207. The foregoing components may be connected through one or more communications buses 2205. The one or more computer programs 2204 are stored in the memory 2203 and are configured to be executed by the one or more processors 2202. The one or more computer programs 2204 include instructions, and the instructions may be used to perform the steps in the corresponding embodiments. All related content of the steps in the foregoing method embodiments may be cited in function descriptions of corresponding physical components. Details are not described herein again.

For example, the processor 2202 may be specifically the processor 110 shown in FIG. 5, the memory 2203 may be specifically the internal memory 121 shown in FIG. 5, the display 2207 may be specifically the display 194 shown in FIG. 5, and the touch sensor may be specifically the touch sensor in the sensor module 180 shown in FIG. 5. This is not limited in embodiments of this application.

The foregoing descriptions about implementations allow a person skilled in the art to understand that, for the purpose of convenient and brief description, division into the foregoing function modules is used as an example for illustration. In actual application, the foregoing functions can be allocated to different function modules and implemented according to a requirement. That is, an inner structure of an apparatus is divided into different function modules to implement all or some of the functions described above. For a specific working process of the foregoing system, apparatus, and unit, refer to a corresponding process in the foregoing method embodiments, and details are not described herein again.

Function units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes: any medium that can store program code, for example, a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A cross-device content projection method implemented by a first electronic device, wherein the cross-device content projection method comprises:
   determining, from a near field communication (NFC) tag, N second electronic devices starting to play first content;
   bound to the NFC tag, wherein N is an integer greater than 1, wherein the N second electronic devices comprise a first speaker and a second speaker, and wherein determining the N second electronic devices comprises:
      reading, in response to a OneHop operation of approaching or touching the NFC tag, identifiers of the N second electronic devices stored in the NFC tag to determine the N second electronic devices bound to the NFC tag; or
      reading, after detecting an NFC signal from the NFC tag by using an NFC chip, the identifiers of the N second electronic devices stored in the NFC tag to determine the N second electronic devices bound to the NFC tag, wherein the NFC chip is comprised in the first electronic device; and
   projecting, according to a preset projection policy, the first content onto at least two of the N second electronic devices for continuous playing, wherein projecting the first content comprises sending, according to the preset projection policy, the first content to the at least two of the N second electronic devices for playing, and wherein sending the first content comprises:
      sending the first content to the first speaker for playing, wherein the first speaker is closest to the first electronic device; or
      sending the first content to the first speaker and the second speaker for playing,
      wherein sending the first content to the first speaker and the second speaker for playing comprises:
         sending a first audio component in the first content to the first speaker for playing; and
         sending a second audio component in the first content to the second speaker for playing.

2. The cross-device content projection method of claim 1, wherein the N second electronic devices further comprise a speaker and a television (TV), and wherein sending the first content comprises:
   sending display content in the first content to the TV for playing and sending audio content in the first content to the speaker for playing; or
   sending the display content to the TV for playing and sending the audio content to the TV and the speaker for playing.

3. The cross-device content projection method of claim 1, wherein before projecting the first content, the cross-device content projection method further comprises synchronizing time with the N second electronic devices, wherein the first content carries a timestamp, and wherein the timestamp indicates play progress of the first content.

4. The cross-device content projection method of claim 1, wherein after determining the N second electronic devices, the cross-device content projection method further comprises receiving, from a user, the preset projection policy for the N second electronic devices.

5. A first electronic device, comprising:
   a touchscreen comprising a touch sensor and a display;
   a memory configured to store instructions; and
   a processor coupled to the touchscreen and the memory and configured to execute the instructions to cause the first electronic device to:
      start to play first content;
      determine, from a near field communication (NFC) tag, N second electronic devices bound to the NFC tag, wherein N is an integer greater than 1, wherein the N second electronic devices comprise a first speaker and a second speaker, and wherein determining the N second electronic devices comprises:
         reading, in response to a OneHop operation of approaching or touching the NFC tag, identifiers of the N second electronic devices stored in the NFC tag to determine the N second electronic devices bound to the NFC tag; or
         reading, after detecting an NFC signal from the NFC tag by using an NFC chip, the identifiers to determine the N second electronic devices bound to the NFC tag, wherein the NFC chip is comprised in the first electronic device; and
      project, according to a preset projection policy, the first content onto at least two of the N second electronic devices for continuous playing, wherein projecting the first content comprises sending, according to the preset projection policy, the first content to the at least two of the N second electronic devices for playing, and wherein sending the first content comprises:
         sending the first content to the first speaker for playing, wherein the first speaker is closest to the first electronic device; or sending the first content to the first speaker and the second speaker for playing, and
wherein sending the first content to the first speaker and the second speaker for playing comprises:
sending a first audio component in the first content to the first speaker for playing; and
sending a second audio component in the first content to the second speaker for playing.

6. The first electronic device of claim 5, wherein the N second electronic devices further comprise a speaker and a television (TV), and wherein sending the first content to the at least two of the N second electronic devices for playing comprises:
sending display content in the first content to the TV for playing and sending audio content in the first content to the speaker for playing; or
sending the display content in the first content to the TV for playing and sending the audio content in the first content to the TV and the speaker for playing.

7. A computer program product comprising instructions stored on a non-transitory computer-readable medium that, when executed by one or more processors, cause a first electronic device to:
start to play first content;
determine, from a near field communication (NFC) tag, N second electronic devices bound to the NFC tag, wherein N is an integer greater than 1, wherein the N second electronic devices comprise a first speaker and a second speaker, and wherein determining the N second electronic devices comprises:
reading, in response to a OneHop operation of approaching or touching the NFC tag, identifiers of the N second electronic devices stored in the NFC tag to determine the N second electronic devices bound to the NFC tag; or
reading, after detecting an NFC signal from the NFC tag by using an NFC chip, the identifiers to determine the N second electronic devices bound to the NFC tag, wherein the NFC chip is comprised in the first electronic device; and
project, according to a preset projection policy, the first content onto at least two of the N second electronic devices for continuous playing, wherein projecting the first content comprises sending, according to the preset projection policy, the first content to the at least two of the N second electronic devices for playing, and
wherein sending the first content comprises:
sending the first content to the first speaker for playing, wherein the first speaker is closest to the first electronic device; or
sending the first content to the first speaker and the second speaker for playing, and
wherein sending the first content to the first speaker and the second speaker for playing comprises:
sending a first audio component in the first content to the first speaker for playing; and
sending a second audio component in the first content to the second speaker for playing.

8. The computer program product of claim 7, wherein the N second electronic devices further comprise a speaker and a television (TV), and wherein sending the first content comprises:
sending display content in the first content to the TV for playing and sending audio content in the first content to the speaker for playing; or
sending the display content to the TV for playing and sending the audio content to the TV and the speaker for playing.

9. The computer program product of claim 7, wherein before projecting the first content, the one or more processors are further configured to cause the first electronic device to synchronize time with the N second electronic devices, wherein the first content carries a timestamp, and wherein the timestamp indicates play progress of the first content.

10. The computer program product of claim 7, wherein after determining the N second electronic devices, the one or more processors are further configured to cause the first electronic device to receive, from a user, the preset projection policy for the N second electronic devices.

* * * * *

UNITED STATES PATENT AND TRADEMARK OFFICE
CERTIFICATE OF CORRECTION

| | |
|---|---|
| PATENT NO. | : 11,818,420 B2 |
| APPLICATION NO. | : 17/773346 |
| DATED | : November 14, 2023 |
| INVENTOR(S) | : Yudong Wang and Xiaohui Wu |

It is certified that error appears in the above-identified patent and that said Letters Patent is hereby corrected as shown below:

In the Claims

Claim 1, Column 29, Lines 42-43: "comprises: determining, from" should read "comprises: starting to play first content; determining, from"

Claim 1, Column 29, Lines 44-46: "electronic devices starting to play first content; bound to the" should read "electronic devices bound to the"

Signed and Sealed this
Twenty-eighth Day of May, 2024

Katherine Kelly Vidal
*Director of the United States Patent and Trademark Office*